(12) United States Patent
Won et al.

(10) Patent No.: US 10,111,179 B2
(45) Date of Patent: Oct. 23, 2018

(54) DEVICE AND METHOD OF UPLINK POWER CONTROL

(71) Applicant: Samsung Electronics Co., Ltd., Suwon-si, Gyeonggi-do (KR)

(72) Inventors: Kyung-hoon Won, Seongnam-si (KR); Ho-il Kim, Yongin-si (KR); Min-goo Kim, Hwaseong-si (KR); Soo-bok Yeo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/499,157

(22) Filed: Apr. 27, 2017

(65) Prior Publication Data
US 2018/0027498 A1   Jan. 25, 2018

(30) Foreign Application Priority Data
Jul. 22, 2016 (KR) .................. 10-2016-0093465

(51) Int. Cl.
*H04W 52/14*   (2009.01)
*H04W 52/54*   (2009.01)

(52) U.S. Cl.
CPC ......... *H04W 52/146* (2013.01); *H04W 52/54* (2013.01)

(58) Field of Classification Search
CPC ... H04W 52/146; H04W 52/18; H04W 52/20; H04W 52/22; H04W 52/24; H04W 52/54; H04W 52/56; H04W 52/58
See application file for complete search history.

(56) References Cited

U.S. PATENT DOCUMENTS

| | | | |
|---|---|---|---|
| 6,088,324 A * | 7/2000 | Sato ................... | H04W 52/223 370/203 |
| 6,343,206 B1 | 1/2002 | Miya et al. | |
| 6,459,884 B1 | 10/2002 | Amezawa | |
| 7,184,791 B2 | 2/2007 | Nilsson et al. | |
| 7,333,812 B2 | 2/2008 | Mochizuki | |
| 7,751,846 B2 | 7/2010 | Suzuki | |
| 8,712,464 B2 | 4/2014 | Andersson et al. | |
| 9,055,536 B2 | 6/2015 | Venkatachari et al. | |
| 2007/0191046 A1* | 8/2007 | Catreux-Erceg .... | H04W 52/241 455/522 |
| 2007/0191047 A1* | 8/2007 | Catreux-Erceg ...... | H04W 52/10 455/522 |
| 2013/0322332 A1* | 12/2013 | Tsai ................... | H04W 52/241 370/328 |

FOREIGN PATENT DOCUMENTS

| JP | 2006295679 A | 10/2006 |
|---|---|---|
| KR | 10-0945336 B1 | 3/2010 |

* cited by examiner

*Primary Examiner* — Dong-Chang Shiue
(74) *Attorney, Agent, or Firm* — Harness, Dickey & Pierce, P.L.C.

(57) ABSTRACT

A method of uplink power control including generating a transmission power control (TPC) sequence from TPC commands received on a series of slots, the series of slots forming one radio frame, calculating a plurality of correlation results by executing correlation calculations between the TPC sequence and a plurality of command sequences, and determining an overall TPC command based on the plurality of correlation results may be provided.

20 Claims, 20 Drawing Sheets

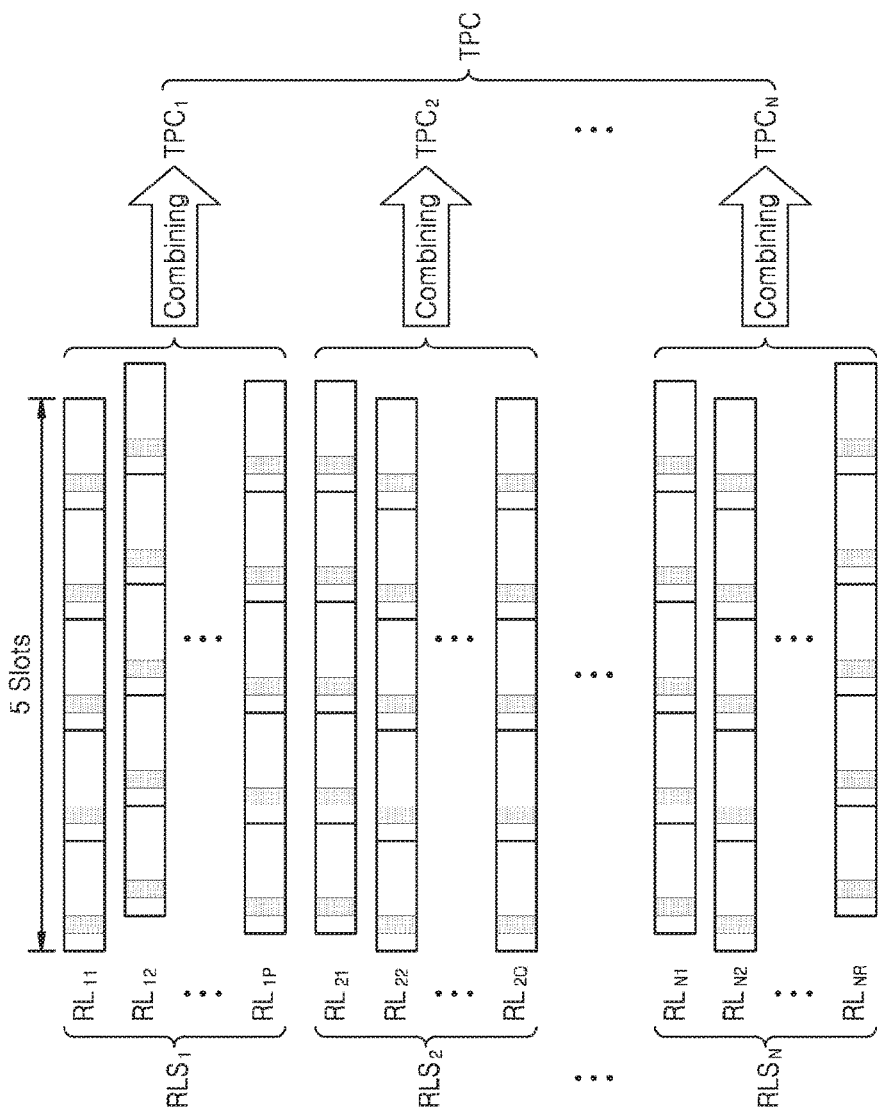

DEVICE AND METHOD OF UPLINK POWER CONTROL

CROSS-REFERENCE TO RELATED APPLICATION

This application claims priority under 35 U.S.C. § 119 to Korean Patent Application No. 10-2016-0093465, filed on Jul. 22, 2016, in the Korean Intellectual Property Office, the disclosure of which is incorporated herein in its entirety by reference.

BACKGROUND

The inventive concepts relate to wireless communication systems, and more particularly, to devices and methods of uplink power control.

In a wireless communication system, radio frequency (RF) signal transmission between a base station (BS) (for example, Node B) and user equipment (UE) is prone to be affected by path loss or shadow fading, and therefore, the BS and the UE are desired to have proper transmission power to mitigate or prevent deterioration of quality of service (QoS). Therefore, in a wireless communication system, power control techniques maintaining QoS at a desired (or alternatively, predetermined) level or higher and controlling data transmission to consume data less power consumption have been used.

SUMMARY

The inventive concepts provide devices and/or methods of uplink power control capable of improving the efficiency of a power control technique based on detection of a transmission power control (TPC) command with high accuracy.

According to an aspect of the inventive concepts, a method of uplink power control may include generating a transmission power control (TPC) sequence from TPC commands received on a series of slots, the series of slots forming one radio frame, calculating a plurality of correlation results by executing correlation calculations between a plurality of TPC sequences and a plurality of command sequences, and deciding an overall TPC command based on the plurality of correlation results.

According to another aspect of the inventive concepts, a device for uplink power control may include a sequence generator configured to generate a transmission power control (TPC) sequence from TPC commands received on a series of slots, the series of slots forming one radio frame, a correlation calculator configured to calculate a plurality of correlation results by executing correlation calculations between the TPC sequence and a plurality of command sequences, and a TPC command determiner configured to decide an overall TPC command based on the plurality of correlation results.

According to another aspect of the inventive concepts, a method of uplink power control may include receiving a plurality of transmission power control (TPC) commands on a series of slots, the series of slots forming one radio frame, generating a TPC sequence from the plurality of TPC commands, the TPC sequence including N elements by buffering the plurality of TPC commands on N slots (where N is a natural number), calculating a plurality of correlation results between a plurality of TPC sequences and a plurality of command sequences, the plurality of command sequences being command sequences stored in a memory, each of the plurality of command sequences corresponding to one of uplink power-up, uplink power-down, or uplink power-hold, and determining an overall TPC command based on the plurality of correlation results

BRIEF DESCRIPTION OF THE DRAWINGS

Example embodiments of the inventive concepts will be more clearly understood from the following detailed description taken in conjunction with the accompanying drawings in which:

FIG. 8 is an example view of an operation of a receiver in FIG. 1, according to an example embodiment of the inventive concepts;

DETAILED DESCRIPTION

Figure 1:
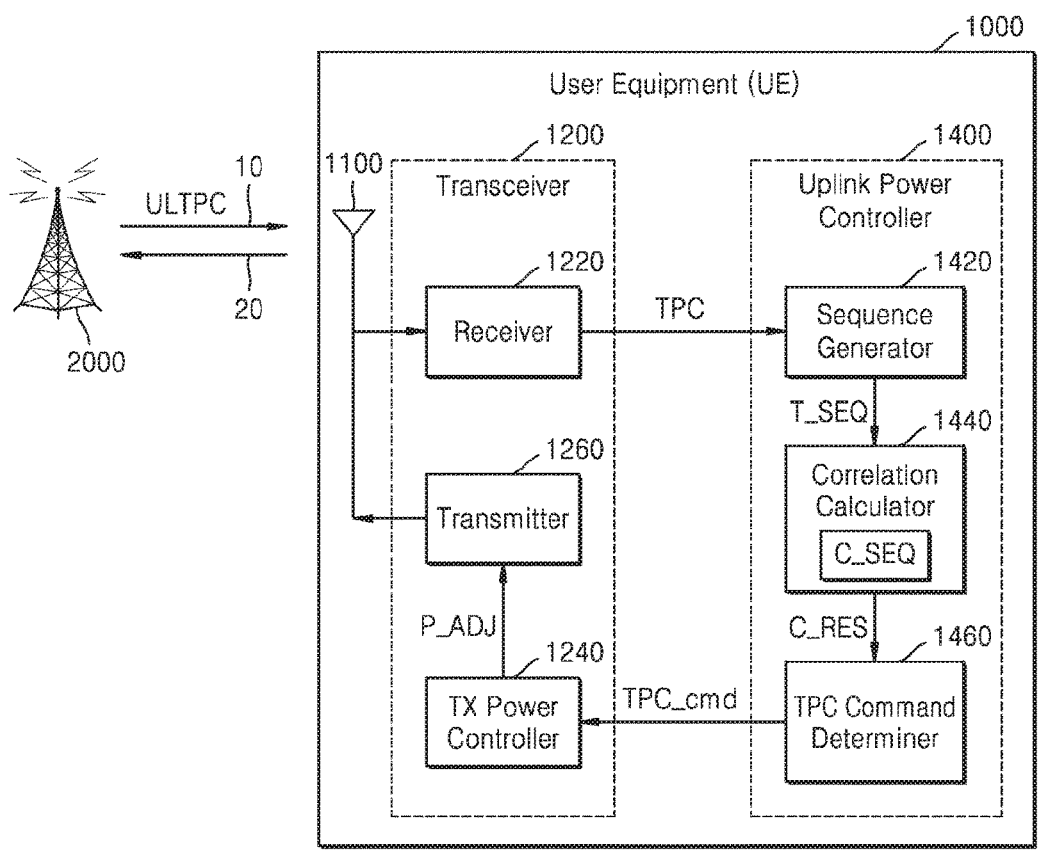
FIG. 1 is a block diagram of a wireless communication system using an uplink power control method, according to an example embodiment of the inventive concepts.

Various example embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are merely provided so that this disclosure will be thorough and complete, and will fully convey the scope of example embodiments to those skilled in the art. In the drawings, the sizes and relative sizes of the various layers and regions may have been exaggerated for clarity. Like numerals refer to like elements throughout.

FIG. 1 is a block diagram of a wireless communication system using an uplink power control method, according to an example embodiment of the inventive concepts. As illustrated in FIG. 1, user equipment (UE) 1000 and a base station (BS) 2000 may communicate with each other through a downlink (DL) channel 10 and an uplink (UL) channel 20.

The UE 1000 may be fixed or may be mobile, and may include various devices capable of transmitting and receiving data and/or control information to/from the BS 2000 by communicating with the BS 2000. For example, the UE 1000 may be referred to as terminal equipment, a mobile station (MS), a mobile terminal (MT), a user terminal (UT), a subscriber station (SS), a wireless device, or a handheld device. In general, the BS 2000 may be referred to as a fixed station communicating with the UE and/or other BS, and may exchange data and control information with the UE and/or other BS by communicating with the UE and/or other BS. For example, the BS 2000 may be referred to as Node B, evolved-Node B (eNB), a base transceiver system (BTS), or an access point (AP).

A wireless communication network may support communication between a plurality of users by sharing available network resources. As one example of the wireless communication network, a universal mobile telecommunications system (UMTS) terrestrial radio access network (UTRAN) is a radio access network (RAN) defined by a UMTS, one of the 3rd generation (3G) mobile communication techniques standardized by the 3rd generation partnership project (3GPP). The UMTS may support various air interface standards such as wideband-code division multiple access (W-CDMA), time division-code division multiple access (TD-CDMA), and time division-synchronous code division multiple access (TD_SCDMA). Hereinafter, the UE 1000 and the BS 2000a communicating with each other under the UTRAN according to an example embodiment of the inventive concepts are described. However, the inventive concepts are not limited thereto, and it will be understood that the inventive concepts also apply to other wireless communication networks.

Transmission power of the UE 1000 may be controlled by a UL transmission power control (ULTPC) command transmitted from the BS 2000 to the UE 1000 through the DL channel 10. For example, the BS 2000 may transmit a transmission power control (TPC) command (e.g., the ULTPC command) to the UE 1000 based on an estimated signal-to-interference ratio (SIR) to maintain an SIR of a radio frequency (RF) signal received from the UE 1000 at a target level. The UE 1000 may control, for example, up, down, and/or hold power of RF signals transmitting to the BS 2000 through the UL channel 20 based on the TPC command received from the BS 2000. The UE 1000 may control the transmitting power by accurately detecting the received TPC command because the control may affect various fields in a cell such as power consumption of the UE 1000, communication between the BS 2000 and another UE, and/or communication between the UE 1000 and the BS 2000. As described below with reference to various example embodiments, a device and a method of uplink power control according to example embodiments of the inventive concepts may increase efficiency of a power control technique in a wireless communication system by accurately detecting the TPC command from the UE 1000.

Referring to FIG. 1, the UE 1000 may include an antenna 1100, a transceiver module 1200, and an uplink power controller 1400. The transceiver module 1200 may include a receiver 1220, a transmission power controller 1240, and a transmitter 1260. The uplink power controller 1400 may include a sequence generator 1420, a correlation calculator 1440, and a TPC command determiner 1460. Each of the components included in the UE 1000 may be a hardware block including an analog circuit and/or a digital circuit, may be a software block including a plurality of instructions executed by a processor, or may be a combination of hardware and software components.

The receiver 1220 of the transceiver module 1200 may receive RF signals from the BS 2000 through the antenna 1100, and may extract a plurality of TPC commands TPC from the received RF signals. For example, the receiver 1220 may include a demodulator and a decoder, and may extract a plurality of TPC commands TPC by demodulating and decoding the RF signals received from the BS 2000 through the antenna 1100. Structures of the RF signals received from the BS 2000 and forms of the TPC commands will be described below in detail with reference to FIG. 2.

The sequence generator 1420 of the uplink power controller 1400 may receive the plurality of TPC commands from the receiver 1220, and a TPC sequence T_SEQ may be generated from the plurality of TPC commands TPC. As described below with reference to FIGS. 2 to 4, the BS 2000 may transmit a plurality of TPC commands TPC on a series of slots to the UE 1000, and the sequence generator 1420 may generate the TPC sequence T_SEQ having each of the plurality of TPC commands TPC as an element, for example, by buffering the plurality of TPC commands TPC. Thus, detection accuracy of the TPC commands transmitted by the BS 2000 may be improved by using the TPC sequence T_SEQ generated from the TPC commands TPC.

The correlation calculator 1440 may receive the TPC sequence T_SEQ from the sequence generator 1420, and may include a plurality of command sequences C_SEQ. For example, the correlation calculator 1440 may include a storage space (e.g., a memory or a register) storing a plurality of command sequences C_SEQ. The correlation calculator 1440 may calculate a plurality of correlation results C_RES by executing correlation calculations between the TPC sequence T_SEQ and the plurality of command sequences C_SEQ. A correlation result may indicate a degree of relation between both sequences, for example, one of the plurality of command sequences C_SEQ and the TPC sequence T_SEQ, and may be calculated by various methods. The correlation calculator 1440 will be described below in detail with reference to FIGS. 5A and 5B, and FIG. 9.

The TPC command determiner 1460 may receive the plurality of correlation results C_RES from the correlation calculator 1440, and may decide an overall TPC command TPC_cmd based on the plurality of correlation results C_RES. For example, the TPC command determiner 1460 may extract a maximum correlation result from among the plurality of correlation results C_RES, and may decide whether the overall TPC command TPC_cmd is a command for uplink power-up, uplink power-down, or uplink power-hold based on the maximum correlation result. The TPC command determiner 1460 will be described below in detail with reference to FIG. 6, and FIGS. 10 to 12B.

The transmission power controller 1240 of the transceiver module 1200 may receive the overall TPC command TPC_cmd from the TPC command determiner 1460 of the uplink power controller 1400, and may generate a power adjustment signal P_ADJ based on the overall TPC command TPC_cmd. For example, the transmission power controller 1240 may control the amount of the uplink power-up or the uplink power-down based on the overall TPC command TPC_cmd. According to some example embodiments, the transmission power controller 1240 may control the uplink power-up, the uplink power-down, and the uplink power-hold (e.g., transmission power-up, transmission power-down, and transmission power-hold). Although FIG. 1 illustrates that the transceiver module 1200 receives the overall TPC command TPC_cmd from the TPC command determiner 1460 according to an example embodiment of the inventive concepts, the TPC command determiner 1460 may generate desired (or alternatively, preset) control signals and send to the transmission power controller 1240, and the transmission power controller 1240 may generate the power adjustment signal P_ADJ in response to the control signals received from the TPC command determiner1460, based on the decided overall TPC command TPC_cmd.

The transmitter 1260 may adjust power of RF signals to be transmitted to the BS 2000 through the antenna 1100 based on the power adjustment signal P_ADJ received from the transmission power controller 1240. For example, the transmitter 1260 may increase, decrease, or hold power of RF signals by a specific amount based on the power adjustment signal P_ADJ.

Figure 2:
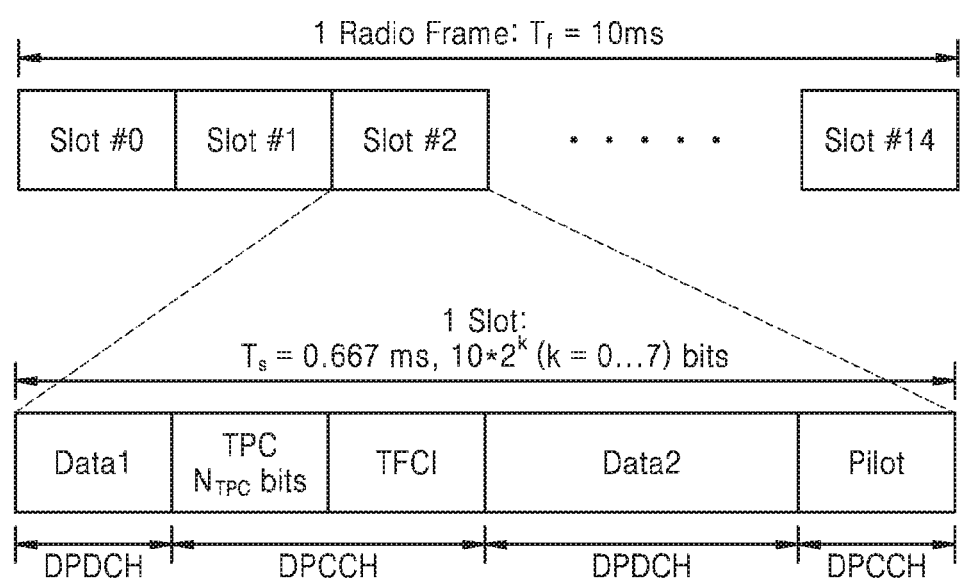
FIG. 2 is an example view of a frame structure of a downlink channel in FIG. 1.

FIG. 2 is an example view of a frame structure of the DL channel 10 in FIG. 1. For example, FIG. 2 illustrates a structure of a downlink dedicated physical channel (DPCH) of W-CDMA, and a TPC command generated by the BS 2000 of FIG. 1 may be included in a corresponding slot as a TPC symbol. The DPCH may include a dedicated physical data channel (DPDCH) and a dedicated physical control channel (DPCCH). Hereinafter, FIG. 2 will be described referring to FIG. 1.

Referring to FIG. 2, one frame (or a radio frame) may have a period of 10 ms, and may include 15 slots (Slot #0 to Slot #14). Furthermore, one slot may have a period of 0.667 ms, and may include discontinuous DPDCH sections and DPCCH sections. As illustrated in FIG. 2, the TPC symbol may be included in a DPCCH section within one slot, and may have $N_{TPC}$ number of bits. The receiver 1220 may extract a TPC command from the TPC symbol included in the slot, and the extracted TPC command may be the same as or different from the TPC command received from the BS 2000 due to path loss or interference.

In the "3GPP Technical Specification 25.214" specifying a frequency division duplex (FDD) of a UMTS, the 3GPP proposes three power control algorithms (PCAs) for uplink power control between the UE 1000 and the BS 2000. According to one of the three PCAs designated by UTRAN, the BS 2000 may transmit the TPC command to the UE 1000 and the UE 1000 may derive the TPC command.

A second PCA PCA2 from among the three algorithms proposes deriving the overall TPC command TPC_cmd by the UE 1000 using TPC commands included in five slots. In the case that one frame includes 15 slots as illustrated in FIG. 2, the BS 2000 may control uplink power three times in a frame section according to the PCA2. In the PCA2, the overall TPC command TPC_cmd may have a value of one of 1, −1 and 0 indicating uplink power-up, uplink power-down, and uplink power-hold, respectively, and a TPC symbol included in each of the five slots may be extracted as a TPC command having a value of, for example, 1 or 0 by a hard decision. The UE 1000 may evaluate the five TPC commands extracted by the hard decision according to the PCA2 as described below, and may derive the overall TPC command TPC_cmd.

According to the communication environment of the UE 1000 and the BS 2000, the UE 1000 may receive a TPC command through a single radio link (RL), or a plurality of TPC commands through a plurality of RLs. The plurality of RLs may be divided into each of RLs included in an identical radio link set (RLS). For example, the UE 1000 may receive a TPC command depending on any one of an RL, a plurality of RLs included in an RLS, or a plurality of RLSs. An RLS may refer to a group of at least one RL commonly generating TPC commands in a downlink. For example, the BS 2000 may divide a cell into a plurality of sectors, and the UE 1000 may receive TPC commands from a plurality of RLs corresponding to at least two sectors. Furthermore, in a handover, the UE 1000 may receive TPC commands from at least two different base stations through a plurality of RLs.

According to the PCA2, when receiving a TPC command through one RL, 1-1) the overall TPC command TPC_cmd is 0 in the first four slots and the overall TPC command TPC_cmd is 1 in a fifth slot when all hard decision results of the 5 slots are 1, 1-2) the overall TPC command TPC_cmd is −1 when all hard decision results of the 5 slots are 0, and 1-3) the overall TPC command TPC_cmd is 0 except for cases 1-1) and 1-2).

According to the PCA2, when receiving a plurality of TPC commands through a plurality of RLs included in an RLS, 2-1) TPC symbols of each of the RLs may be combined using, for example, software algorithm, and 2-2) the overall TPC command TPC_cmd may be derived like 1-1) to 1-3).

According to the PCA2, when receiving a plurality of TPC commands through N (N is an integer greater than 1) RLSs, 3-1) the TPC symbols of each of the RLs are combined, using, for example, software algorithm, in each of the N RLSs, and N temporary TPC commands TPC_temp are derived like 1-1) to 1-3), 3-2) the overall TPC command TPC_cmd is −1 when even one of the N TPC commands is −1, 3-3) the overall TPC command TPC_cmd is 1 when an average value of the N TPC commands is greater than 0.5, and 3-4) the overall TPC command TPC_cmd is 0 except for cases 3-2) and 3-3).

In order to analyze the TPC command detection performance of the PCA2, the probability of detecting TPC commands may be calculated in one RL or one RLS by a hard decision, according to the PCA2. On an assumption that the DL channel 10 is an additive white Gaussian noise (AWGN) channel, a TPC command y, extracted from ith (i=1, 2, 3, 4, 5) slot from among five slots may be represented by Equation 1 as follows when a TPC command received from the BS 2000 through a TPC symbol of the ith slot is a, and Gaussian noise is $n_i$.

$$y_i = a_i + n_i \qquad \text{[Equation 1]}$$

When the BS 2000 transmits a TPC command ($a_i$=1, and i=1, 2, 3, 4, 5) corresponding to uplink power-up, the probability $P_{HD,UP|UP}$ of detecting the TPC command may be represented by Equation 2 as follows. In Equation 2, $a_i$ indicates a TPC command having an absolute value $\mu_y$, and $n_i$ indicates Gaussian noise having an average value of 0 and dispersion $\sigma_n^2$.

$$P_{HD,UP|UP} = \prod_{i=1}^{5} P(y_i > 0 | a_i = 1) =$$ [Equation 2]

$$\left[\int_0^\infty \frac{1}{\sqrt{2\pi\sigma_n^2}} \exp\left(-\frac{(y-\mu_y)^2}{2\sigma_n^2}\right) dy\right]^5 = \left[Q\left(\frac{-\mu_y}{\sigma_n}\right)\right]^5$$

When the BS 2000 transmits a TPC command ($a_i$=−1, and i=1, 2, 3, 4, 5) corresponding to uplink power-down, the probability $P_{HD,DOWN|DOWN}$ of detecting the TPC command may also be represented by Equation 2.

When the BS 2000 transmits a TPC command [−1, 1, −1, 1, −1] or [1, −1, 1, −1, 1] corresponding to uplink power-hold, the probability $P_{HD,HOLD|HOLD}$ of detecting the TPC command may be represented by Equation 3 as follows.

$$P_{HD,HOLD|HOLD} = 1 - (P_{HD,UP|HOLD} + P_{HD,DOWN|HOLD})$$ [Equation 3]

$$= 1 - \left(\left[Q\left(\frac{-\mu_y}{\sigma_n}\right)\right]^3 \cdot \left[Q\left(\frac{\mu_y}{\sigma_n}\right)\right]^2 + \left[Q\left(\frac{-\mu_y}{\sigma_n}\right)\right]^2 \cdot \left[Q\left(\frac{\mu_y}{\sigma_n}\right)\right]^3\right)$$

Figure 3:
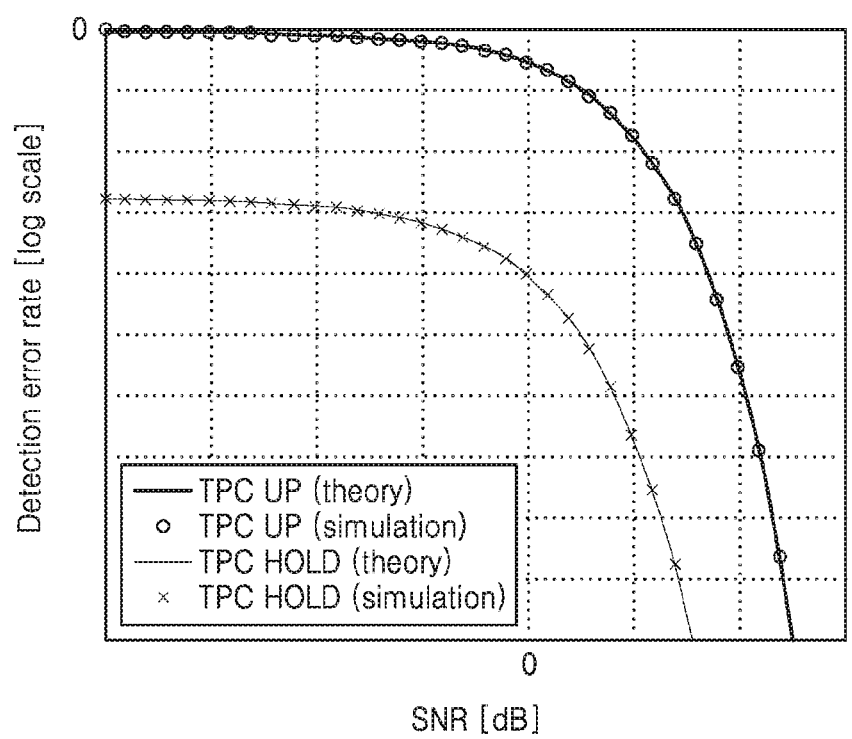
FIG. 3 is a graph illustrating detection performance of a transmission power control (TPC) command according to a second power control algorithm (PCA2)

FIG. 3 is a graph illustrating detection performance of a TPC command according to the PCA2. In particular, FIG. 3 illustrates detection performance of a PCA3 calculated based on Equation 2 and Equation 3 when the BS 2000 transmits a TPC command corresponding to each of uplink power-up and uplink power-hold.

Referring to FIG. 3, because uplink power-up or uplink power-down is determined only when all signs of TPC commands received on five slots according to the PCA2 are identical, the probability of detecting a TPC command corresponding to uplink power-up or uplink power-down is relatively low. Meanwhile, the probability of detecting a TPC command corresponding to uplink power-hold is relatively high. According to an example embodiment of the inventive concepts, devices and/or methods of uplink power control may improve detection accuracy of a TPC command by improving the relatively low probability of detecting a TPC command, corresponding to uplink power-up or uplink power-down.

Figure 4:
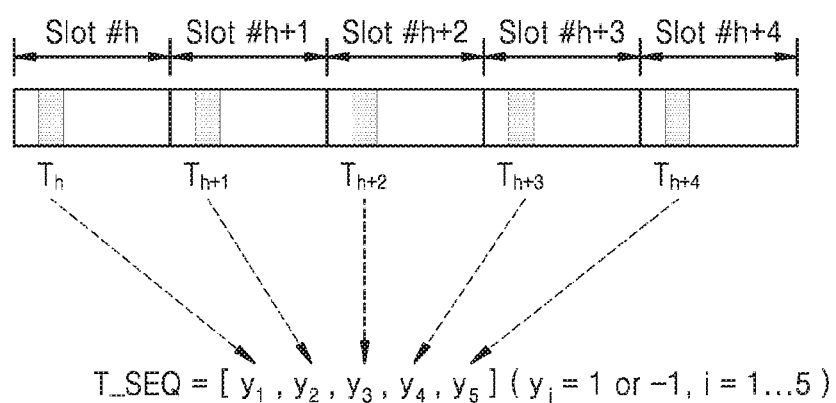
FIG. 4 is an example view of an operation of a sequence generator in FIG. 1, according to an example embodiment of the inventive concepts.

FIG. 4 is an example view of an operation of the sequence generator 1420 in FIG. 1, according to an example embodiment of the inventive concepts. As described above with reference to FIG. 1, the sequence generator 1420 may generate the TPC sequence T_SEQ from the plurality of TPC commands TPC.

Referring to FIG. 4, the sequence generator 1420 may generate the TPC sequence T_SEQ from TPC commands $T_h$ to $T_{h+4}$ extracted from TPC symbols included in each of a series of slots Slot #h to Slot #h+4 by the receiver 1220. For example, when the series of slots Slot #h to Slot #h+4 are sequentially transmitted to the receiver 1220 and the receiver 1220 sequentially provides the sequence generator 1420 with the TPC commands $T_h$ to $T_{h+4}$, the sequence generator 1420 may generate the TPC sequence T_SEQ by buffering the five TPC commands $T_h$ to $T_{h+4}$.

TPC sequence T_SEQ may include five elements $y_1$ to $y_5$, and the five elements $y_1$ to $y_5$ may be generated from the five TPC commands $T_h$ to $T_{h+4}$, respectively. For example, after excluding noise and other estimation errors, $y_2$ may be represented by a value corresponding to 1 when the TPC command ($T_{h+i}$) is 1 and $y_3$ may be represented by a value corresponding to −1 when the TPC command ($T_{h+2}$) is 0. One frame includes 15 slots as illustrated in FIG. 2, and thus, the TPC sequence T_SEQ may generate three TPC sequences T_SEQ from a single frame.

Figure 5A:
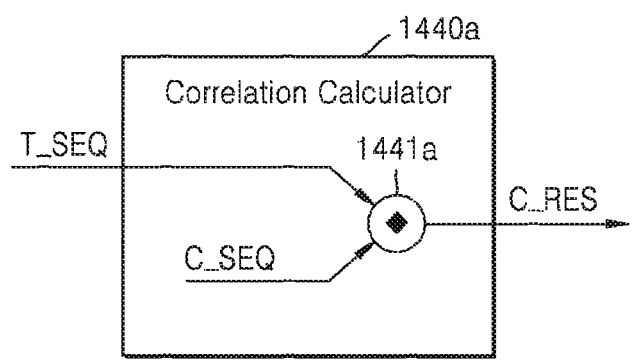
FIGS. 5A and 5B are block diagrams of a correlation calculator in FIG. 1, according to an example embodiment of the inventive concepts.
Figure 5B:
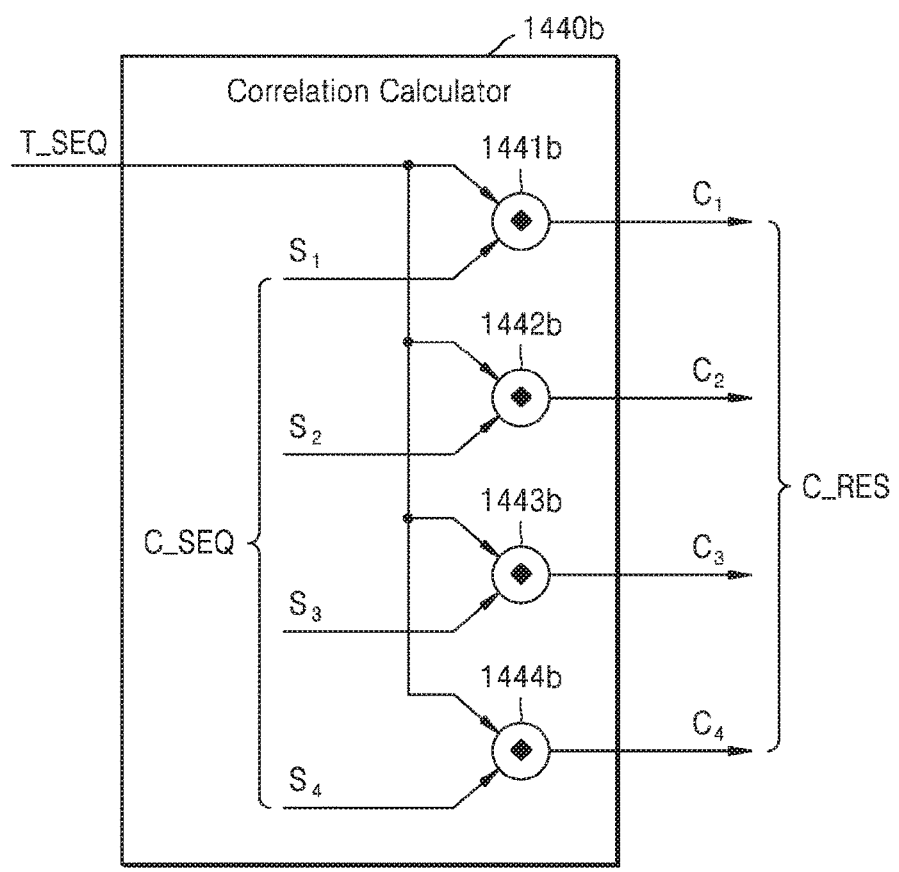

FIGS. 5A and 5B are block diagrams of the correlation calculator 1440 in FIG. 1, according to an example embodiment of the inventive concepts. As described above with reference to FIG. 1, the correlation calculator 1440 may calculate a plurality of correlation results C_RES by executing the correlation calculation between the TPC sequence T_SEQ and the plurality of command sequences C_SEQ.

Referring to FIG. 5A, a correlation calculator 1440a may include a correlator 1441a, and the correlator 1441a may calculate the plurality of correlation results C_RES by executing correlation calculations between the TPC sequence T_SEQ and the plurality of command sequences C_SEQ. The plurality of command sequences C_SEQ may include command sequences $S_{up}$, $S_{down}$, and $S_{hold}$ corresponding to uplink power-up, uplink power-down, or uplink power-hold, respectively, and the plurality of correlation results C_RES may include correlation results $C_{up}$, $C_{down}$, and $C_{hold}$ corresponding to the command sequences $S_{up}$, $S_{down}$, and $S_{hold}$, respectively. According to an example embodiment of the inventive concepts, the number of command sequences respectively corresponding to each of uplink power-up, uplink power-down, and uplink power-hold may be at least two. For example, as described below, the number of command sequences corresponding to uplink power-hold may be two (e.g., $S_3$ and $S_4$), and accordingly, the number of correlation results corresponding to uplink power-hold may also be two (e.g., $C_3$ and $C_4$). Although the plurality of command sequences C_SEQ including four command sequences $S_1$ to $S_4$ and the plurality of correlation results C_RES including four correlation results $C_1$ to $C_4$ are described herein below, the number of each of the plurality of command sequences C_SEQ and the plurality of correlation results C_RES are not limited thereto.

A correlation calculation corresponding to two sequences may be performed by various methods. For example, as illustrated in FIG. 4, when the TPC sequence T_SEQ is [$y_1$, $y_2$, $y_3$, $y_4$, $y_5$], and a command sequence $S_{up}$ indicating uplink power-up from among the plurality of command sequences C_SEQ is [$s_1$, $s_2$, $s_3$, $s_4$, $s_5$], each of which is composed of 1 or −1, a correlation result $C_{up}$ indicating uplink power-up from among the plurality of correlation results C_RES may be calculated by Equation 4 as follows.

$$C_{up} = T\_SEQ \blacklozenge S_{up} = \sum_{i=1}^{5} y_i * s_i$$ [Equation 4]

When the correlation calculation is performed like Equation 4, each of the plurality of correlation results C_RES may have a value corresponding to a range of 5 to −5 because a value of one of the plurality of command sequences C_SEQ and each of the elements of the TPC sequence T_SEQ is 1 or −1 after excluding noise and other errors. In the specification, '♦' indicates a correlation calculator corresponding to two sequences. Equation 4 is merely an example of a correlation calculation corresponding to two sequences of the correlation calculator 1440a, and it will be understood that any correlation calculation generating a correlation result proportional to similarity of two sequences is possible.

In order to decide the overall TPC command TPC_cmd represented by the TPC sequence T_SEQ, the plurality of command sequences C_SEQ may include first to fourth command sequences $S_1$ to $S_4$ according to an example embodiment of the inventive concepts may be provided to the TPC command determiner 1460. For example, a first sequence $S_1$ is [1, 1, 1, 1, 1], which is identical to a TPC sequence T_SEQ corresponding to uplink power-up (e.g., TPC_cmd=1), a second sequence $S_2$ is [−1, −1, −1, −1, −1], which is identical to a TPC sequence T_SEQ corresponding to uplink power-down (e.g., TPC_cmd=−1), and third and fourth sequences $S_3$ and $S_4$ are [−1, 1, −1, 1, −1] and [1, −1, 1, −1, 1], which are identical to a TPC sequence T_SEQ corresponding to uplink power-hold (e.g., TPC_cmd=0). The correlator 1441a may sequentially generate first to fourth correlation results $C_1$ to $C_4$ as the plurality of correlation results C_RES by sequentially executing correlation calculation between the TPC sequence T_SEQ and the first to fourth command sequences $S_1$ to $S_4$.

Referring to FIG. 5B, a correlation calculator 1440b may include four correlators 1441b to 1444b, the four correlators 1441b to 1444b may commonly receive the TPC sequence T_SEQ, the four correlators 1441b to 1444b may receive the first to fourth command sequences $S_1$ to $S_4$, respectively, and the four correlators 1441b to 1444b may generate the first to fourth correlation results $C_1$ to $C_4$, respectively. Compared to the example of FIG. 5A, the correlation calculator 1440b may execute a correlation calculation between each of the first to fourth command sequences $S_1$ to $S_4$ and the TPC sequence T_SEQ in parallel.

Figure 6:
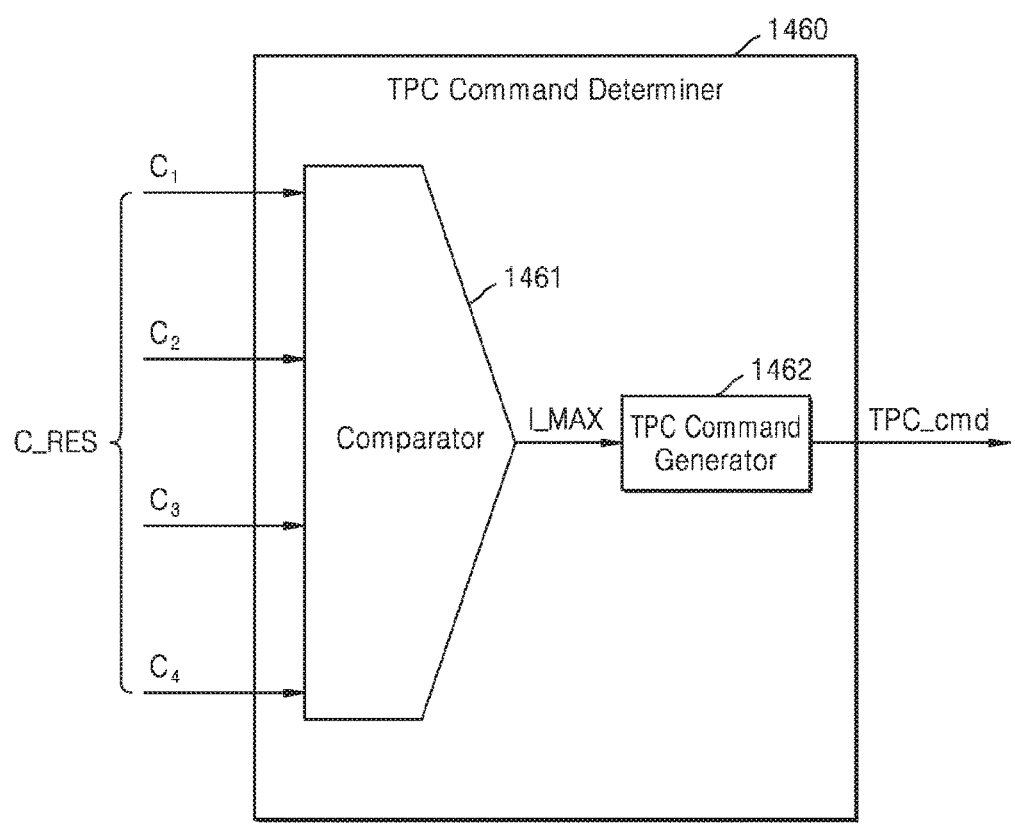
FIG. 6 is a block diagram of a TPC command determiner in FIG. 1, according to an example embodiment of the inventive concepts.

FIG. 6 is a block diagram of the TPC command determiner 1460 in FIG. 1, according to an example embodiment of the inventive concepts. As described above with reference to FIG. 1, the TPC command determiner 1460 may decide the overall TPC command TPC_cmd based on the plurality of correlation results C_RES. Referring to FIG. 6, the TPC command determiner 1460 may include a comparator 1461 and a TPC command generator 1462.

According to an example embodiment of the inventive concepts, the TPC command determiner 1460 may determine the overall TPC command TPC_cmd based on a maximum correlation result having a maximum value from among the plurality of correlation results C_RES. For example, when a value of the first correlation result $C_1$ generated by executing a correlation calculation between the TPC sequence T_SEQ and the first command sequence $S_1$ corresponding to uplink power-up is the maximum value, in other words, when a correlation between the TPC sequence T_SEQ and the first command sequence $S_1$ is the highest, the overall TPC command TPC_cmd may be decided as uplink power-up (e.g., TPC_cmd=1).

Referring to FIG. 6, the comparator 1461 may generate an index I_MAX of the maximum correlation result, the index being the biggest one of the first to fourth correlation results $C_1$ to $C_4$, by comparing the plurality of correlation results C_RES, e.g., the first to fourth correlation results $C_1$ to $C_4$, with one another. As described above, the index I_MAX of the maximum correlation result output from the comparator 1461 may be 1 when the maximum correlation result is the first correlation result $C_1$.

The TPC command generator 1462 may receive the index I_MAX of the maximum correlation result, and may generate the overall TPC command TPC_cmd based on the index I_MAX of the maximum correlation result. For example, when the index I_MAX of the maximum correlation result is 1 (e.g., when a correlation between the TPC sequence T_SEQ and the first command sequence $S_1$ is the highest), the overall TPC command TPC_cmd generated by the TPC command generator 1462 may be 1. When the index I_MAX of the maximum correlation result is 2, the overall TPC command TPC_cmd may be −1, and when the index I_MAX of the maximum correlation result is 3 or 4, the overall TPC command TPC_cmd may be 0.

According to an example embodiment of the inventive concepts, the probability of detecting a TPC command may be calculated by executing a correlation calculation between the TPC sequence T_SEQ and each of the plurality of command sequences C_SEQ and by deciding the overall TPC command TPC_cmd based on a maximum correlation result. When the BS 2000 transmits a TPC command indicating up or down of uplink power control (e.g., $a_i$=a and i=1, 2, 3, 4, 5), the first to fourth correlation results $C_1$ to $C_4$ according to respective correlation calculations between the TPC sequence T_SEQ [$y_1$, $y_2$, $y_3$, $y_4$, $y_5$] and the first to fourth command sequences $T_1$ to $T_4$ [1,1,1,1,1], [−1,−1,−1,−1,−1], [−1,1,−1,1,−1], and [1,−1,1,−1,1] may be represented by Equation 5 as follows.

$$C_1 = 5a + \Sigma_{i=1}^{5} n_i$$

$$C_2 = -5a + \Sigma_{i=1}^{5} n_i$$

$$C_3 = -a + \Sigma_{i=1}^{5} (-1)^i n_i$$

$$C_4 = a + \Sigma_{i=1}^{5} (-1)^{i-1} n_i \qquad \text{[Equation 5]}$$

Therefore, when the BS 2000 transmits a TPC command corresponding to uplink power-up, the probability $P_{Cor,UP|UP}$ of detecting the TPC command may be represented by Equation 6 as follows.

$$P_{Cor,UP|UP} = P(C_1 > C_2) \cdot P(C_1 > C_3) \cdot P(C_1 > C_4) \qquad \text{[Equation 6]}$$

Each term on the right side in Equation 6 may be represented by Equation 7 as follows.

$$P(C_1 > C_2) = P(5a + \Sigma_{i=1}^{5} n_i > -5a - \Sigma_{i=1}^{5} n_i) = P(5a > -\Sigma_{i=1}^{5} n_i)$$

$$P(C_1 > C_3) = P(5a + \Sigma_{i=1}^{5} n_i > -a + \Sigma_{i=1}^{5} (-1)^i n_i) = P(3a > -(n_1 + n_3 + n_5))$$

$$P(C_1 > C_4) = P(5a + \Sigma_{i=1}^{5} n_i > a + \Sigma_{i=1}^{5} (-1)^{i-1} n_i) = P(2a > -(n_2 + n_4)) \qquad \text{[Equation 7]}$$

In Equation 7, $P(C_1 > C_2) = P(5a > -\Sigma_{i=1}^{5} n_i)$ is 1 when $2a > -(n_2 + n_4)$ and $3a > -(n_1 + n_3 + n_5)$, and thus, $P_{Cor,UP|UP}$ may be represented again by Equation 8 as follows.

$$\begin{aligned} P_{Cor,UP|UP} &= P(C_1 > C_3) \cdot P(C_1 > C_4) \\ &= P\left(a > -\frac{n_1 + n_3 + n_5}{3}\right) \cdot P\left(a > -\frac{n_2 + n_4}{2}\right) \\ &= Q\left(\frac{-\mu_y}{\sigma_n/\sqrt{3}}\right) \cdot Q\left(\frac{-\mu_y}{\sigma_n/\sqrt{2}}\right) \end{aligned} \qquad \text{[Equation 8]}$$

Furthermore, when the BS 2000 transmits a TPC command indicating hold of uplink power control (e.g., $a_1$=−a, $a_2$=a, $a_3$=−a, $a_4$=a, $a_5$=−a), the first to fourth correlation results $C_1$ to $C_4$ according to respective correlation calculations between the TPC sequence T_SEQ and the first to fourth command sequences $T_1$ to $T_4$ may be represented by Equation 9 as follows.

$$C_1 = -a + \Sigma_{i=1}^{5} n_i$$

$$C_2 = a - \Sigma_{i=1}^{5} n_i$$

$$C_3 = 5a + \Sigma_{i=1}^{5} (-1)^i n_i$$

$$C_4 = -5a + \Sigma_{i=1}^{5} (-1)^i n_i \qquad \text{[Equation 9]}$$

Therefore, when the BS 2000 transmits a TPC command corresponding to uplink power-hold, the probability $P_{Cor,HOLD|HOLD}$ of detecting the TPC command may be represented by Equation 10 as follows.

$$P_{Cor,HOLD|HOLD} = P(C_3 > C_1) \cdot P(C_3 > C_2) \quad \text{[Equation 10]}$$

Each term on the right side in Equation 10 may be represented by Equation 11 as follows.

$$P(C_3 > C_1) = P\left(5a + \sum_{i=1}^{5}(-1)^i \cdot n_i > -a + \sum_{i=1}^{5} n_i\right) = \quad \text{[Equation 11]}$$

$$P(3a > n_1 + n_3 + n_5)$$

$$P(C_3 > C_2) = P\left(5a + \sum_{i=1}^{5}(-1)^i \cdot n_i > a - \sum_{i=1}^{5} n_i\right) =$$

$$P(2a > -(n_2 + n_4))$$

Therefore, $P_{Cor,HOLD|HOLD}$ may be represented again by Equation 12 as follows.

$$P_{Cor,HOLD|HOLD} = P(C_3 > C_1) \cdot P(C_3 > C_2) \quad \text{[Equation 12]}$$

$$= P\left(a > \frac{n_1 + n_3 + n_5}{3}\right) \cdot P\left(a > -\frac{n_2 + n_4}{2}\right)$$

$$= Q\left(\frac{-\mu_y}{\sigma_n/\sqrt{3}}\right) \cdot Q\left(\frac{-\mu_y}{\sigma_n/\sqrt{2}}\right)$$

Figure 7A:
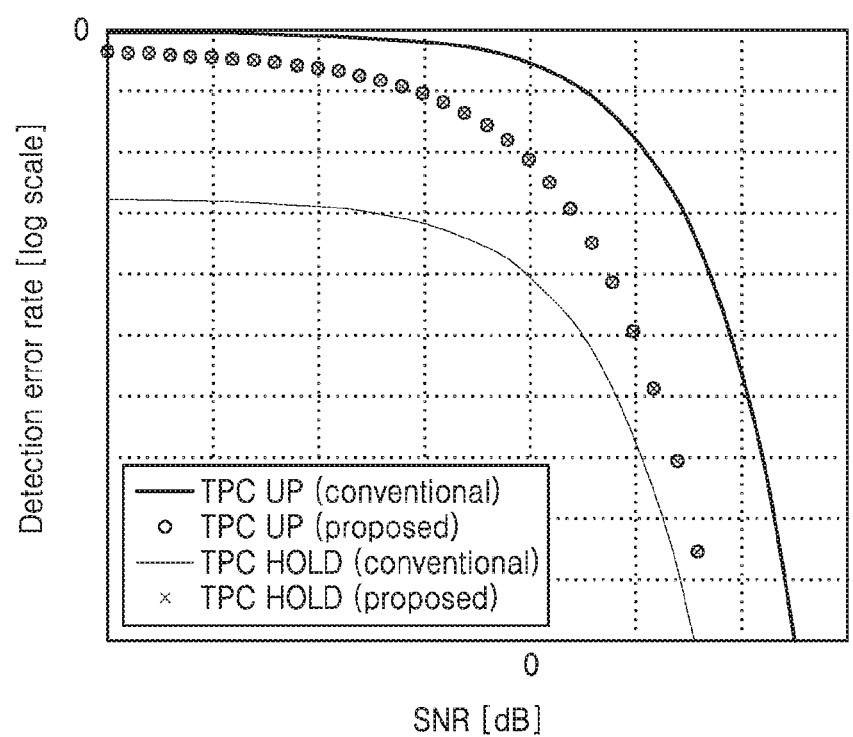
FIGS. 7A and 7B are graphs illustrating TPC command detection performance according to an example embodiment of the inventive concepts.
Figure 7B:
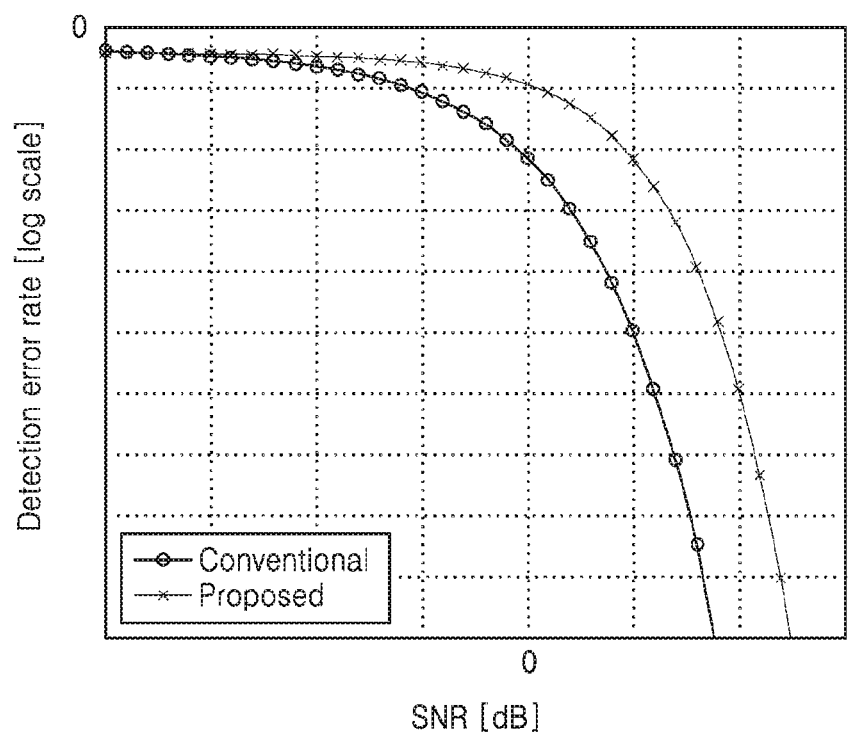

FIGS. 7A and 7B are graphs illustrating TPC command detection performance according to an example embodiment of the inventive concepts. FIG. 7A illustrates TPC detection performance according to an example embodiment of the inventive concepts and TPC detection performance according to the PCA2, and FIG. 7B illustrates TPC detection performance according to an example embodiment of the inventive concepts and TPC detection performance according to the PCA2 when applying ⅓ of the previous probability corresponding to each of uplink power-up, uplink power-down, and uplink power-hold. In the graphs of FIGS. 7A and 7B, the vertical axis indicates a detection error rate (DER) and the horizontal axis indicates a signal-to-noise ratio (SNR).

Referring to FIG. 7A, according to the PCA2, the probability of detecting uplink power-up is lower than that of detecting uplink power-hold, as illustrated in FIG. 3. Meanwhile, the TPC detection performance according to an example embodiment of the inventive concepts is the same in both uplink power-up and uplink power-hold, as supported by Equation 8 and Equation 12.

Referring to FIG. 7B, the TPC detection performance according to an example embodiment of the inventive concepts has higher detection probability than the TPC detection performance according to the PCA2. For example, the TPC detection performance according to an example embodiment of the inventive concepts may have a performance gain of about 5 dB in a region having a DER of 0.1.

As described above, the UE 1000 of FIG. 1 may receive TPC commands through a plurality of RLs. Hereinafter, processes of deciding the overall TPC command TPC_cmd will be described referring to FIGS. 8 to 12B when the UE 1000 of FIG. 1 receives TPC commands through a plurality of RLs according to an example embodiment of the inventive concepts.

FIG. 8 is an example view of an operation of the receiver 1220 in FIG. 1, according to an example embodiment of the inventive concepts. As described above with reference to FIG. 1, the receiver 1220 may extract TPC commands TPC from a received signal.

As illustrated in FIG. 8, when the UE 1000 of FIG. 1 receives TPC commands through N RLSs $RLS_1$ to $RLS_N$, the receiver 1220 may recognize RLs included in respective RLSs based on a TPC-combining index, and may generate N TPC commands $TPC_1$ to $TPC_N$ corresponding to the N RLSs $RLS_1$ to $RLS_N$, respectively, by combining (for example, combining using software algorithm) TPC symbols received through the RLs included in an identical RLS. For example, the receiver 1220 may extract first TPC commands $TPC_1$ by combining TPC symbols received through RLs $RL_{11}$ to $RL_{1P}$ of a first RLS $RLS_1$. The TPC commands $TPC_1$ to $TPC_N$ generated by the receiver 1220 may be provided to the sequence generator 1420 of the uplink power controller 1400, and the sequence generator 1420 may generate TPC sequences $T\_SEQ_1$ to $T\_SEQ_N$ from the TPC commands $TPC_1$ to $TPC_N$.

Figure 9:
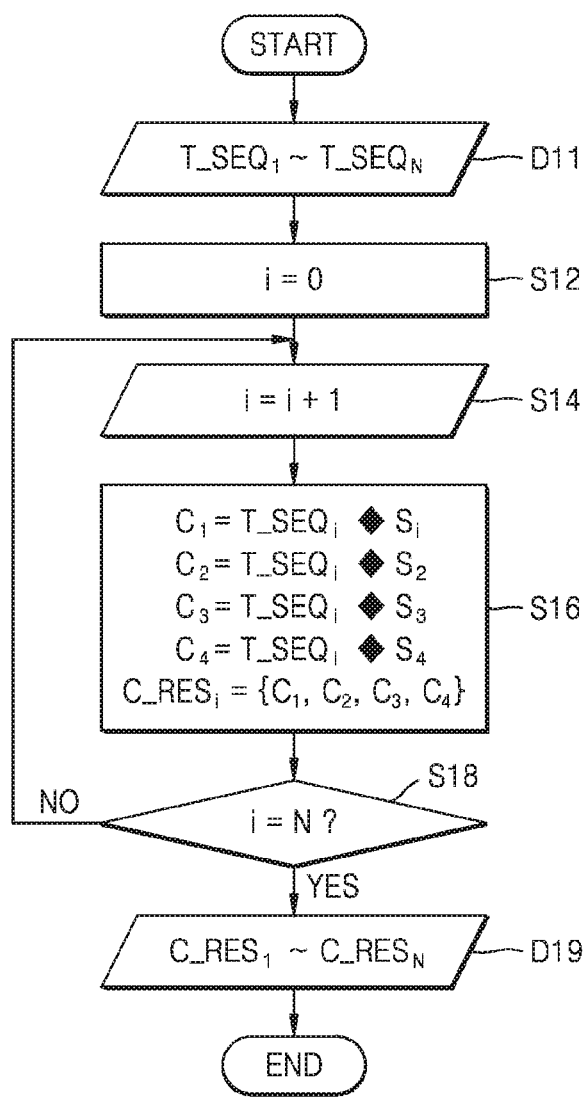
FIG. 9 is an example view of an operation of a correlation calculator in FIG. 1, according to an example embodiment of the inventive concepts.

FIG. 9 is an example view of an operation of the correlation calculator 1440 in FIG. 1, according to an example embodiment of the inventive concepts. As described above with reference to FIG. 1, the correlation calculator 1440 may generate the plurality of correlation results C_RES by respectively executing correlation calculations between the plurality of command sequences C_SEQ and a plurality of TPC sequences T_SEQ. Furthermore, as described above with reference to FIG. 8, the sequence generator 1420 of FIG. 1 may generate N TPC sequences $T\_SEQ_1$ to $T\_SEQ_N$ (D11) from the TPC commands $TPC_1$ to $TPC_N$ generated by the receiver 1220, and may provide the correlation calculator 1440 with the N TPC sequences $T\_SEQ_1$ to $T\_SEQ_N$ (D11).

Referring to FIG. 9, in operation S12, a variable i may be initialized, and in operation S14, the variable i may be increased by 1. During the correlation calculation, the variable i may be 1 or within a range of N that is the number of TPC sequences $T\_SEQ_1$ to $T\_SEQ_N$ (e.g., the number of RLSs).

In operation S16, a correlation calculation between each of the command sequences C_SEQ and an ith TPC sequence $T\_SEQ_i$ may be executed. As illustrated in FIG. 9, the four correlation results $C_1$ to $C_4$ may be calculated by executing a correlation calculation between each of the four command sequences $S_1$ to $S_4$ and the ith TPC sequence $T\_SEQ_i$. The calculated four correlation results $C_1$ to $C_4$ may include correlation results $C\_RES_i$ corresponding to the ith TPC sequence $T\_SEQ_i$ (or an ith RLS $RLS_i$).

In operation S18, an operation of deciding whether the variable i is equal to N, which is the number of TPC sequences $T\_SEQ_1$ to $T\_SEQ_N$, may be performed. When the variable i is not equal to N in operation S14, the variable i may be increased by 1 to generate correlation results $C\_RES_{i+1}$ corresponding to an i+1th TPC sequence $T\_SEQ_{i+1}$. When the variable i is equal to N, correlation results $C\_RES_1$ to $C\_RES_N$ corresponding to the N TPC sequences $T\_SEQ_1$ to $T\_SEQ_N$ (e.g., the N RLSs $RLS_1$ to $RLS_N$) may be output (D19).

Figure 10:
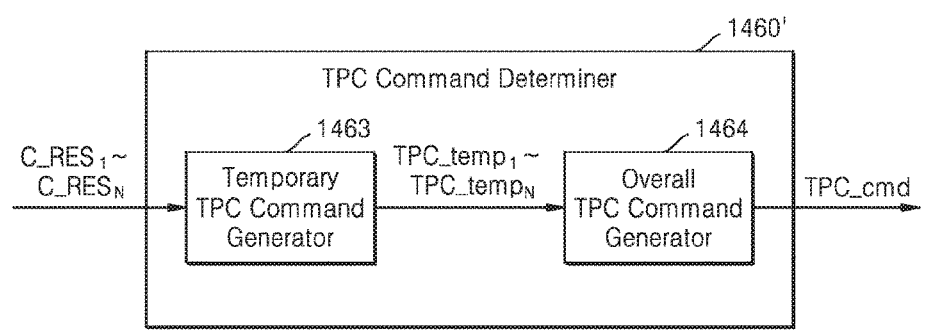
FIG. 10 is a block diagram of a TPC command determiner in FIG. 1, according to an example embodiment of the inventive concepts.

FIG. 10 is a block diagram of the TPC command determiner 1460 in FIG. 1, according to an example embodiment of the inventive concepts. For example, FIG. 10 illustrates a block diagram of a TPC command determiner 1460' deciding the overall TPC command TPC_cmd based on the correlation results $C\_RES_1$ to $C\_RES_N$ generated from a plurality of TPC commands received through a plurality of RLSs. Referring to FIG. 10, the TPC command determiner 1460' may include, for example, a temporary TPC command generator 1463 and an overall TPC command generator 1464.

The temporary TPC command generator 1463 may generate N temporary TPC commands $TPC\_temp_1$ to $TPC\_temp_N$ from the correlation results $C\_RES_1$ to $C\_RES_N$. For example, the temporary TPC command generator 1463 may generate a first temporary TPC command $TPC\_temp_1$ based on a maximum correlation result from among the four correlation results $C_1$ to $C_4$ included in the correlation result $C\_RES_1$ corresponding to the first RLS $RLS_1$ (or a first TPC sequence $T\_SEQ_1$). For example, similar to that described above with reference to FIG. 6, the first temporary TPC command $TPC\_temp_1$ may be 1 when the first correlation result $C_1$ is the maximum correlation result, the first temporary TPC command $TPC\_temp_1$ may be −1 when the second correlation result $C_2$ is the maximum correlation result, and the first temporary TPC command $TPC\_temp_1$ may be 0 when the third or fourth correlation result $C_3$ or $C_4$ is the maximum correlation result.

The overall TPC command generator 1464 may generate the overall TPC command TPC_cmd based on the N temporary TPC commands $TPC\_temp_1$ to $TPC\_temp_N$. For example, the overall TPC command generator 1464 may generate the overall TPC command TPC_cmd in a same or substantially similar manner as the PCA2. A detailed operation of the overall TPC command generator 1464 is described below with reference to FIG. 11.

Figure 11:
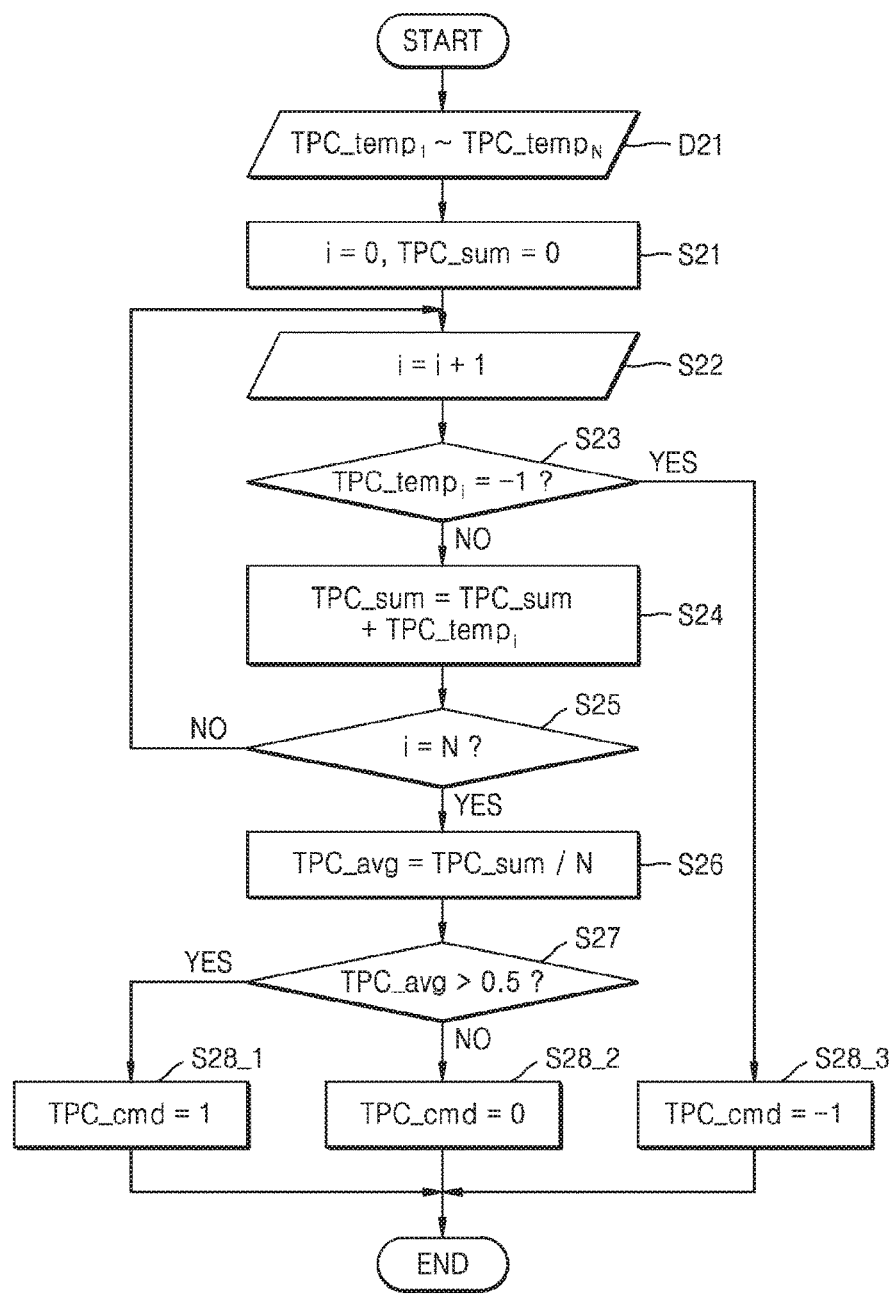
FIG. 11 is a flowchart of an example operation of an overall TPC command generator in FIG. 10, according to an example embodiment of the inventive concepts.

FIG. 11 is a flowchart of an example operation of the overall TPC command generator 1464 in FIG. 10, according to an example embodiment of the inventive concepts. As described above with reference to FIG. 10, the overall TPC command generator 1464 may receive the N temporary TPC commands $TPC\_temp_1$ to $TPC\_temp_N$ from The temporary TPC command generator 1463 (D21).

Referring to FIG. 11, in operation S21, variables i and TPC_sum may be initialized. In operation S22, the variable i may be increased by 1. During generation of the overall TPC command TPC_cmd, the variable i may be 1 or within a range of N, which is the number of temporary TPC commands $TPC\_temp_1$ to $TPC\_temp_N$, and the variable TPC_sum may be a sum of the N temporary TPC commands $TPC\_temp_1$ to $TPC\_temp_N$ as described below.

In operation S23, an operation of deciding whether an ith temporary TPC command $TPC\_temp_i$ is −1 may be performed. When the ith temporary TPC command $TPC\_temp_i$ is −1 in operation S23, an overall TPC command TPC_cmd having a value of −1 may be generated in operation S28_3. When the ith temporary TPC command $TPC\_temp_i$ is not −1 in operation S23, the ith temporary TPC command $TPC\_temp_i$ may be accumulated in operation 24. For example, as illustrated in FIG. 11, the ith temporary TPC command $TPC\_temp_i$ may be added to the variable TPC_sum, thereby updating the variable TPC_sum.

In operation S25, an operation of deciding whether the variable i is equal to N, which is the number of temporary TPC commands $TPC\_temp_1$ to $TPC\_temp_N$, may be performed. When the variable i is not equal to N in operation S22, the variable i may be increased by 1 to evaluate an i+1th temporary TPC command $TPC\_temp_{i+1}$. When the variable i is equal to N, an average of the N temporary TPC commands $TPC\_temp_1$ to $TPC\_temp_N$ may be calculated in operation S26. For example, as illustrated in FIG. 11, a variable TPC_avg indicating the average of the N temporary TPC commands $TPC\_temp_1$ to $TPC\_temp_N$ may be generated by dividing the variable TPC_sum indicating the sum of the N temporary TPC commands $TPC\_temp_1$ to $TPC\_temp_N$ by N.

In operation S27, an operation of deciding whether the variable TPC_avg is greater than 0.5 may be performed. When the variable TPC_avg is greater than 0.5, the overall TPC command TPC_cmd having a value of 1 may be generated in operation S28_1. When the variable TPC_avg is not greater than 0.5, the overall TPC command TPC_cmd having a value of 0 may be generated in operation S28_1.

Figure 12A:
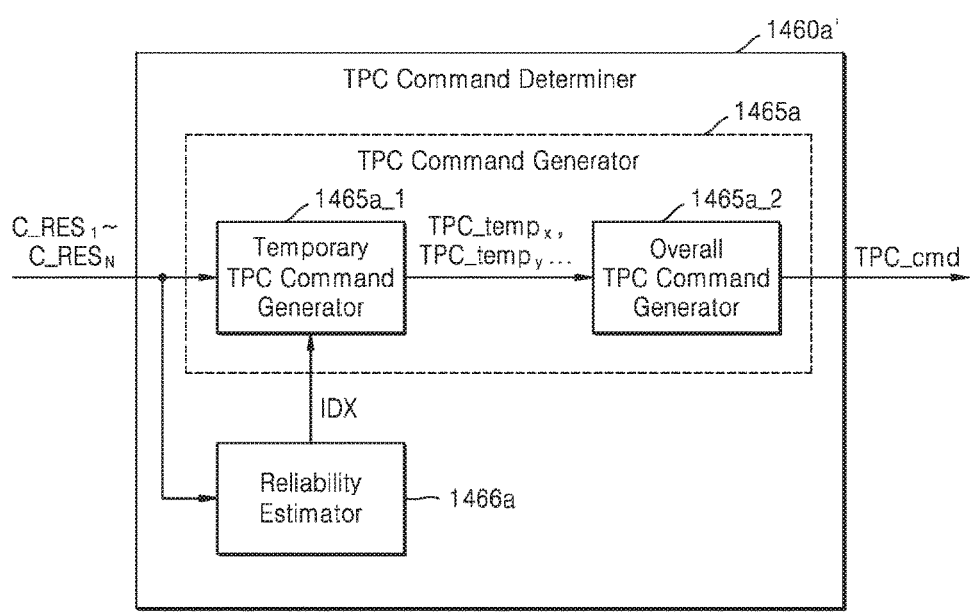
FIGS. 12A and 12B are block diagrams of TPC command determiner 1460a' and 1460b', according to other example embodiments of the inventive concepts.
Figure 12B:
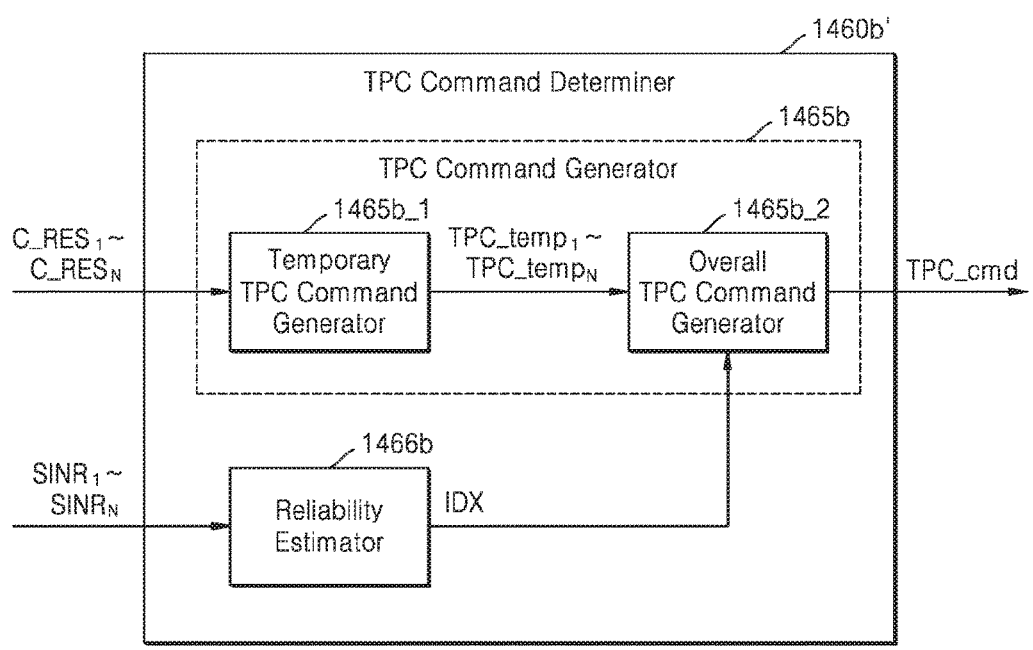

FIGS. 12A and 12B are block diagrams of TPC command determiners 1460a' and 1460b', according to other example embodiments of the inventive concepts. TPC command determiners 1460a' and 1460b' of FIGS. 12A and 12B may decide the overall TPC command TPC_cmd based on reliability of an RLS. For example, TPC commands received through an RLS with reliability lower than a certain level may be excluded during a process of deciding the overall TPC command TPC_cmd.

In FIGS. 12A and 12B, the TPC command determiners 1460a' and 1460b' may include TPC command generators 1465a and 1465b, respectively, and a reliability estimators 1466a and 1466b, respectively. The reliability estimator 1466a (or 1466b) may estimate reliability of the N RLSs $RLS_1$ to $RLS_N$, and may provide the TPC command generators 1465a (or 1465b) with an index IDX of an RLS, which has reliability at a certain level or higher, or has a reliability at a certain level or lower. The TPC command generators 1465a (or 1465b) may generate the overall TPC command TPC_cmd based on an index IDX provided from the reliability estimator 1466a (or 1466b) and based on at least some of the correlation results (e.g., $C\_RES_1$ to $C\_RES_N$) corresponding to the RLS with reliability at a certain level or higher.

Referring to FIG. 12A, the TPC command determiner 1460a' may estimate reliability of the N RLSs $RLS_1$ to $RLS_N$ based on the correlation results $C\_RES_1$ to $C\_RES_N$. As illustrated in FIG. 12A, the TPC command determiner 1460a' may include the TPC command generator 1465a and the reliability estimator 1466a.

The TPC command generator 1465a may include a temporary TPC command generator 1465a_1 and an overall TPC command generator 1465a_2. The temporary TPC command generator 1465a_1 and the overall TPC command generator 1465a_2 may operate in the same manner as or substantially similar manner to the temporary TPC command generator 1463 and the overall TPC command generator 1464 of FIG. 10, respectively. However, the temporary TPC command generator 1465a_1 of FIG. 12A may generate only temporary TPC commands $TPC\_temp_x$, $TPC\_temp_y$, . . . corresponding to at least some of the correlation results $C\_RES_1$ to $C\_RES_N$ based on the index IDX received from the reliability estimator 1466a. For example, the temporary TPC command generator 1465a_1 of FIG. 12A may generate only the temporary TPC commands $TPC\_temp_x$, $TPC\_temp_y$, . . . corresponding to TPC commands received through $RLS_x$, $RLS_y$, . . . with reliability at a certain level or higher. Furthermore, the overall TPC command generator 1465a_2 may generate the overall TPC command TPC_cmd in the same manner as or substantially similar manner to FIG. 11 based on the temporary TPC commands $TPC\_temp_x$, $TPC\_temp_y$, . . . received from the temporary TPC command generator 1465a_1.

The reliability estimator 1466a may receive the correlation results $C\_RES_1$ to $C\_RES_N$ and may estimate reliability of the N RLSs $RLS_1$ to $RLS_N$ based on the correlation results C_RES$_1$ to C_RES$_N$. For example, the reliability estimator 1466*a*, by comparing maximum correlation results corresponding to the N RLSs RLS$_1$ to RLS$_N$ with a desired (or alternatively, preset) threshold value, may provide the temporary TPC command generator 1465*a*_1 with an index IDX of an RLS corresponding to the maximum correlation results higher than the threshold value or the maximum correlation results less than the threshold value.

Referring to FIG. 12B, the TPC command determiner 1460*b*' may estimate reliability of the N RLSs RLS$_1$ to RLS$_N$ based on a signal-to-interference-plus-noise-ratio (SINR) of an RLS. As illustrated in FIG. 12B, the TPC command determiner 1460*b*' may include the TPC command generator 1465*b* and the reliability estimator 1466*b*.

The TPC command generator 1465*b* may include a temporary TPC command generator 1465*b*_1 and an overall TPC command generator 1465*b*_2. The temporary TPC command generator 1465*b*_1 and the overall TPC command generator 1465*b*_2 may operate in the same manner as or substantially similar manner to the temporary TPC command generator 1463 and the overall TPC command generator 1464 of FIG. 10, respectively. However, the overall TPC command generator 1465*b*_2 may decide the overall TPC command TPC_cmd based on an index IDX received from the reliability estimator 1466*b* and based on at least some of the N temporary TPC commands TPC_temp$_1$ to TPC_temp$_N$. For example, the overall TPC command generator 1465*b*_2 may generate, for example, the overall TPC command TPC_cmd in the same manner as or substantially similar manner to FIG. 11 based on temporary TPC commands corresponding to RLSs with reliability at a certain level or higher.

The reliability estimator 1466*b* may receive N SINRs SINTR$_1$ to SINR$_N$, which indicate qualities of the N RLSs RLS$_1$ to RLS$_N$, respectively, and may estimate reliability of the N RLSs RLS$_1$ to RLS$_N$ based on the N SINRs SINR$_1$ to SINR$_N$. For example, the reliability estimator 1466*b*, by comparing the N SINRs SINR$_1$ to SINR$_N$ with a desired (or alternatively, preset) threshold value, may provide the overall TPC command generator 1465*b*_2 with an index IDX of an RLS having higher SINRs than the threshold value or an index IDX of an RLS having less SINRs than the threshold value.

According to some example embodiments of the inventive concepts, the TPC command generators 1465*a* and 1465*b* may be combined with the reliability estimators 1466*a* and 1466*b* differently from FIGS. 12A and 12B. For example, the TPC command generator 1465*a* of FIG. 12A may be combined with the reliability estimator 1466*b* of FIG. 12B, or the TPC command generator 1465*b* of FIG. 12B may be combined with the reliability estimator 1466*a* of FIG. 12A. Furthermore, according to some example embodiments of the inventive concepts, a reliability estimator of a TPC command determiner may receive all of the correlation results C_RES$_1$ to C_RES$_N$ and the N SINRs SINR$_1$ to SINR$_N$, evaluate reliability of the N RLSs RLS$_1$ to RLS$_N$ based on all of the correlation results C_RES$_1$ to C_RES$_N$ and the N SINRs SINR$_1$ to SINR$_N$, and generate an index IDX.

Figure 13:
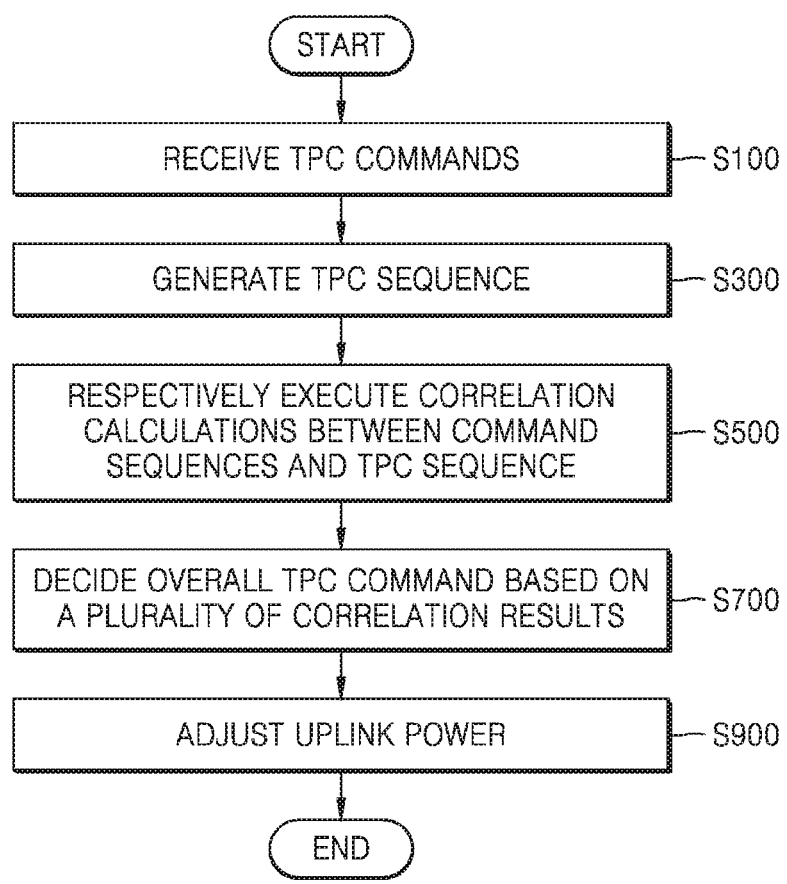
FIG. 13 is a flowchart of an uplink power control method in user equipment (UE), according to an example embodiment of the inventive concepts.

FIG. 13 is a flowchart of an uplink power control method in UE, according to an example embodiment of the inventive concepts. As illustrated in FIG. 13, the uplink power control method may include a plurality of operations S100, S300, S500, S700, and S900.

In operation S100, an operation of receiving TPC commands may be performed. For example, the UE may receive TPC commands on a series of slots. The received TPC commands may be generated by an uplink PCA2 of a frequency division duplex (FFD) UMTS.

In operation S300, an operation of generating a TPC sequence may be performed. For example, the UE may generate a TPC sequence including five elements by buffering the received TPC commands on five slots.

In operation S500, an operation of generating a plurality of correlation results by respectively executing correlation calculations between a plurality of command sequences and the TPC sequence. For example, the UE may generate four correlation results C$_1$ to C$_4$ by executing correlation calculations between four command sequences [t, t, t, t, t], [−t, −t, −t, −t, −t], [−t, t, −t, t, −t], and [t, −t, t, −t, t] where t>0) and the TPC sequence, respectively.

In operation S700, an overall TPC command may be decided based on a plurality of correlation results. For example, the UE may decide an overall TPC command based on a maximum correlation result from among the plurality of correlation results. Operation S700 is described below in detail with reference to FIG. 14.

In operation S900, uplink power may be controlled. For example, the UE may include a transmitter generating an RF signal to be transmitted to a BS (e.g., a Node B), and may adjust power of the RF signal by controlling the transmitter based on the decided overall TPC command.

Figure 14:
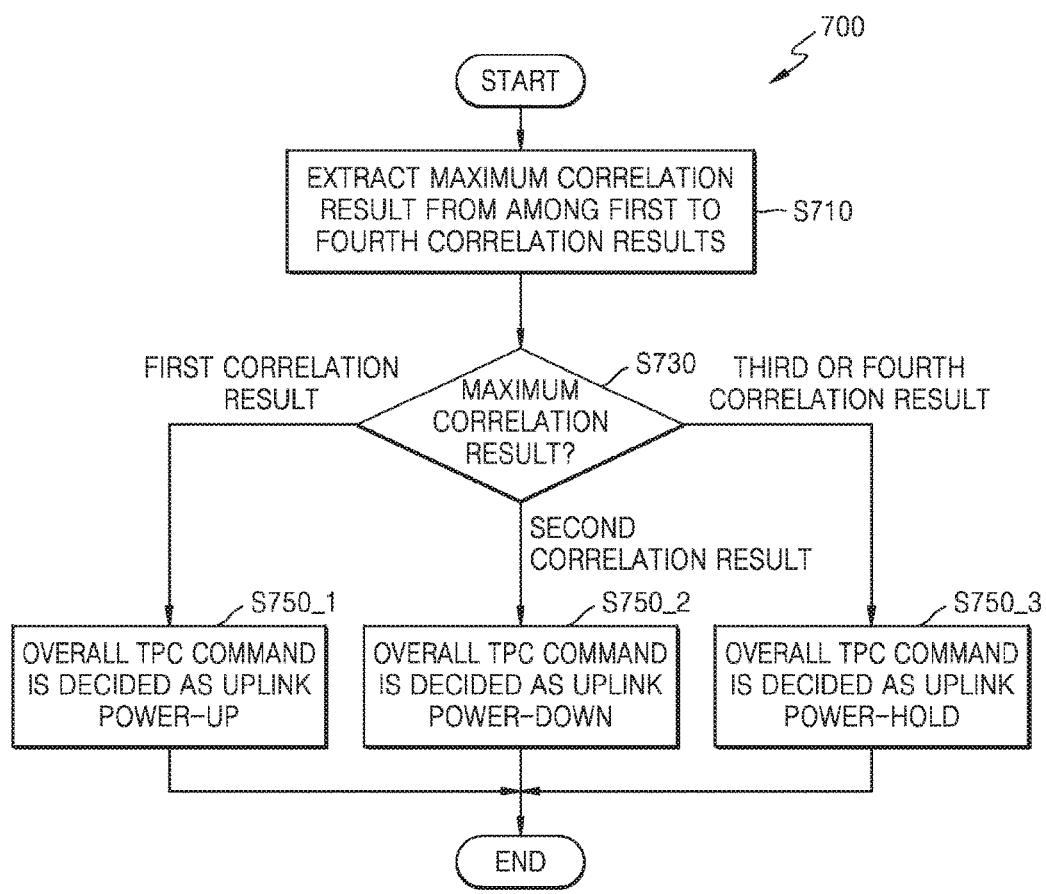
FIG. 14 is a flowchart of an example of operation S700 in FIG. 13, according to an example embodiment of the inventive concepts.

FIG. 14 is a flowchart of an example of operation S700 in FIG. 13, according to an example embodiment of the inventive concepts. As described above with reference to FIG. 13, in operation S700, an overall TPC command may be decided based on a plurality of correlation results.

Referring to FIG. 14, in operation S710, a maximum correlation result may be extracted from among the first to fourth correlation results. For example, the UE may determine a maximum correlation result from among the first to fourth correlation results C$_1$ to C$_4$ generated by operation S500 of FIG. 13, and may extract an index of the maximum correlation result.

In operation S730, the maximum correlation result may be determined from among the first to fourth correlation results. For example, the UE may determine the maximum correlation result from among the first to fourth correlation results based on the index of the extracted maximum correlation result in operation S710.

When the maximum correlation result is the first correlation result (e.g., when the index of the maximum correlation result is 1), the overall TPC command may be decided as uplink power-up in operation S750_1. When the maximum correlation result is the second correlation result (e.g., when the index of the maximum correlation result is 2), the overall TPC command may be decided as uplink power-down in operation S750_2. When the maximum correlation result is the third or fourth correlation result (e.g., when the index of the maximum correlation result is 3 or 4), the overall TPC command may be decided as uplink power-hold in operation S750_3.

Figure 15:
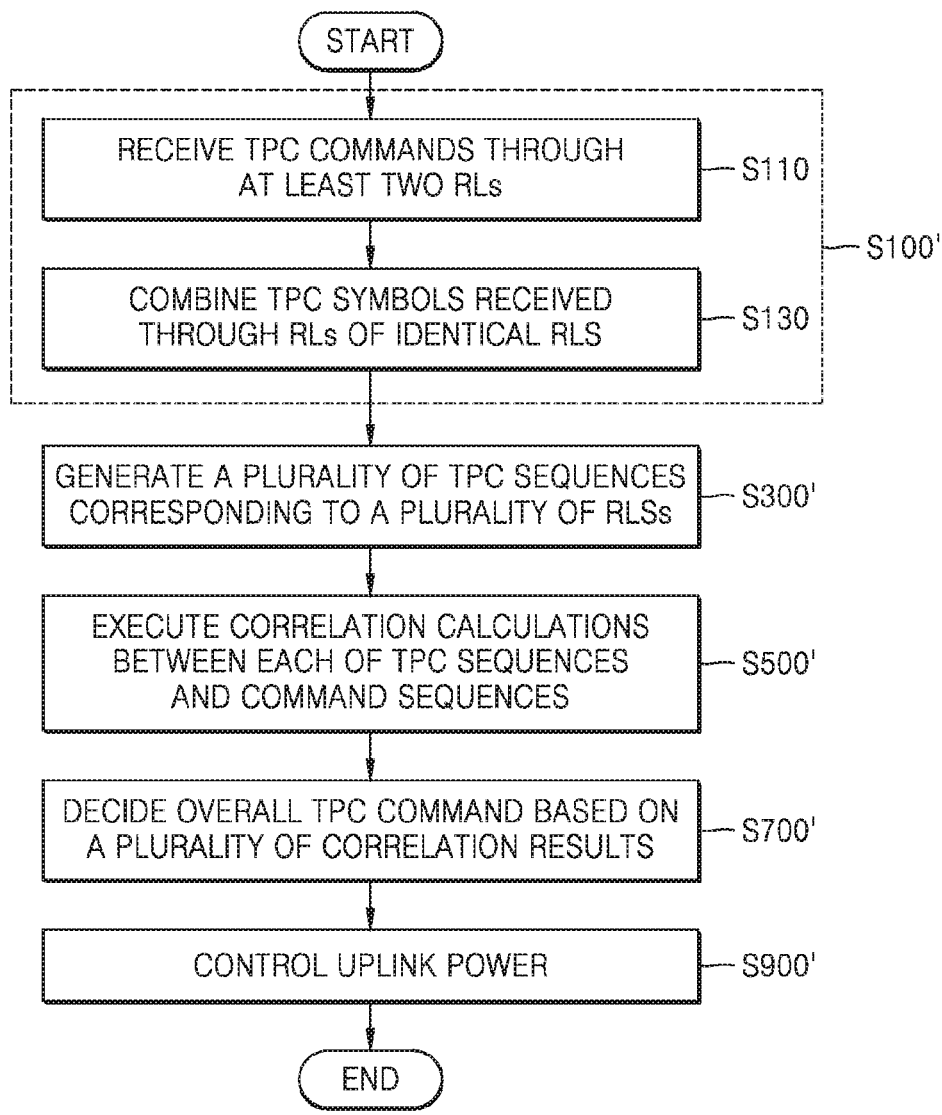
FIG. 15 is a flowchart of an uplink power control method in UE, according to an example embodiment of the inventive concepts.

FIG. 15 is a flowchart of an uplink power control method in UE, according to an example embodiment of the inventive concepts. For example, FIG. 15 illustrates an uplink power control method when the UE receives TPC commands through at least two RLs. As illustrated in FIG. 15, the uplink power control method may include a plurality of operations S100', S300', S500', S700', and S900'.

In operation S100', an operation of receiving TPC commands may be performed. For example, as illustrated in FIG. 15, in operation S110, the UE may receive TPC commands through at least two RLs, and in operation S130, the UE may combine TPC symbols received through RLs of an identical RLS. For example, as illustrated in FIG. 8, the UE may generate the TPC commands $TPC_1$ to $TPC_N$ from signals received through the N RLSs $RLS_1$ to $RLS_N$.

In operation S300', a plurality of TPC sequences corresponding to a plurality of RLSs may be generated. For example, the UE may generate the N TPC sequences $T\_SEQ_1$ to $T\_SEQ_N$ corresponding to the TPC commands $TPC_1$ to $TPC_N$ of the N RLSs $RLS_1$ to $RLS_N$, respectively.

In operation S500', correlation calculations between each of the TPC sequences and command sequences may be executed. For example, the UE may generate the correlation results $C\_RES_1$ to $C\_RES_N$ by executing correlation calculations between the N TPC sequences $T\_SEQ_1$ to $T\_SEQ_N$ and the four command sequences [t, t, t, t, t], [−t, −t, −t, −t, −t], [−t, t, −t, t, −t], and [t, −t, t, −t, t] (where t>0), respectively. Correlation results (e.g., $C\_RES_i$) corresponding to a TPC sequence (e.g., $T\_SEQ_i$) may include the first to fourth correlation results $C_1$ to $C_4$.

In operation S700', an overall TPC command may be decided based on a plurality of correlation results. For example, the UE may generate the N temporary TPC commands $TPC\_temp_1$ to $TPC\_temp_N$ based on the correlation results $C\_RES_1$ to $C\_RES_N$, and for example, as illustrated in FIG. 11, the overall TPC command may be decided based on the N temporary TPC commands $TPC\_temp_1$ to $TPC\_temp_N$.

In operation S900', uplink power may be controlled based on the decided overall TPC command.

Figure 16:
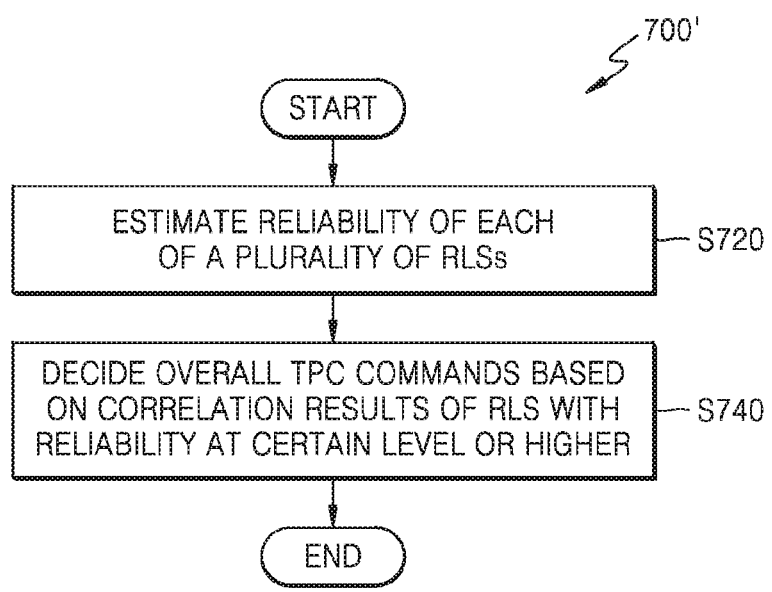
FIG. 16 is a flowchart of an example of operation S700' in FIG. 15, according to an example embodiment of the inventive concepts.

FIG. 16 is a flowchart of an example of operation S700' in FIG. 15, according to an example embodiment of the inventive concepts. As described above with reference to FIG. 15, in operation S700', an overall TPC command may be decided based on a plurality of correlation results.

Referring to FIG. 16, in operation S720, reliability of each of a plurality of RLSs may be estimated. For example, the UE may estimate reliability of each of the N RLSs $RLS_1$ to $RLS_N$ based on maximum correlation results corresponding to the N RLSs $RLS_1$ to $RLS_N$, or based on SINRs $SINR_1$ to $SINR_N$ of the N RLSs $RLS_1$ to $RLS_N$. Furthermore, the UE may estimate reliability of each of the N RLSs $RLS_1$ to $RLS_N$ based on both the maximum correlation results and the SINRs.

In operation S740, overall TPC commands may be decided based on correlation results of an RLS with reliability at a certain level or higher. For example, the UE may compare maximum correlation results corresponding to the N RLSs $RLS_1$ to $RLS_N$ or the SINRs $SINR_1$ to $SINR_N$ of the N RLSs $RLS_1$ to $RLS_N$ with a desired (or alternatively, preset) threshold value. Therefore, the UE may generate a temporary TPC command based on the correlation results of the RLS with reliability at a certain level or higher, and may decide an overall TPC command from the generated at least one temporary TPC command.

Figure 17:
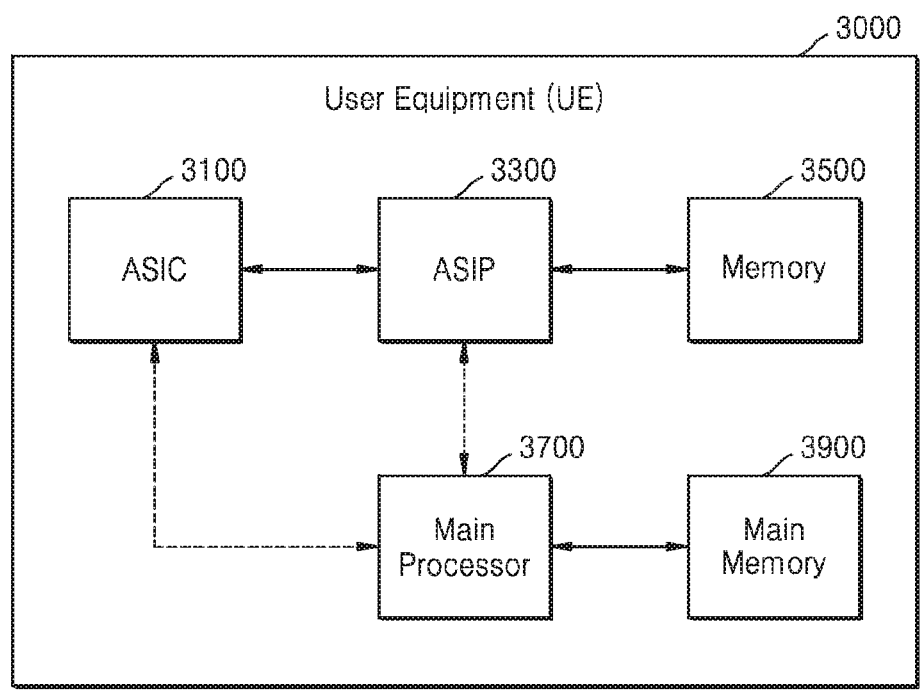
FIG. 17 is a block diagram of user equipment (UE) according to an example embodiment of the inventive concepts.

FIG. 17 is a block diagram of UE 3000 according to an example embodiment of the inventive concepts. As illustrated in FIG. 17, the UE 3000 may include an application specific integrated circuit (ASIC) 3100, an application specific instruction set processor (ASIP) 3300, a memory 3500, a main processor 3700, and a main memory 3900. At least two of the ASIC 3100, the ASIP 3300, and the main processor 3700 may communicate with each other. Furthermore, at least two of the ASIC 3100, the ASIP 3300, the memory 3500, the main processor 3700, and the main memory 3900 may be included in a single chip.

The ASIC 3100 is a customized integrated circuit (IC) for a specific use, and may include, e.g., a radio frequency IC (RFIC), a modulator, and/or a demodulator. The ASIP 3300 may support an exclusive instruction set for a specific application, and may execute an instruction included in the instruction set. The memory 3500 may communicate with the ASIP 3300, and may store a plurality of instructions executed by the ASIP 3300 as a non-transitory storage device. For example, the memory 3500 may include any type of memory accessible by the ASH' 3300, for example, random-access memory (RAM), read-only memory (ROM), magnetic disks, optical disks, volatile memory, nonvolatile memory, or a combination thereof.

The main processor 3700 may control the UE 3000 by executing a plurality of instructions. For example, the main processor 3700 may control the ASIC 3100 and the ASIP 3300, and may also process data received through a wireless communication network or a user input corresponding to the UE 3000. The main memory 3900 may communicate with the main processor 3700, and may store a plurality of instructions executed by the main memory 3900 as a non-transitory storage device. For example, the main memory 3900 may include any type of memory accessible by the main processor 3700, for example, RAM, ROM, magnetic disks, optical disks, volatile memory, nonvolatile memory, or a combination thereof.

Components of UE or an operation of constituting an uplink power control method in the UE according to the above example embodiment of the inventive concepts may be included in at least one of components included in the UE 3000 of FIG. 17. For example, the uplink power controller 1400 of FIG. 1 may include a plurality of instructions stored in the memory 3500, and the uplink power controller 1400 may be operated by executing the plurality of instructions stored in the memory 3500. As another example, the uplink power controller 1400 of FIG. 1 may be realized as a hardware block and included in the ASIC 3100. As another example, the uplink power controller 1400 of FIG. 1 may include a plurality of instructions stored in the main memory 3900, and the main processor 3700 may operate the uplink power controller 1400 by executing the plurality of instructions stored in the main memory 3900.

For example, at least one of operations of FIG. 13 may include a plurality of instructions stored in the memory 3500, and the at least one of operations of FIG. 13 may be performed by the ASIP 3300 executing the plurality of instructions stored in the memory 3500. As another example, at least one of operations of FIG. 13 may be realized as a hardware block and included in the ASIC 3100. Similarly, for example, at least one of operations of FIG. 13 may include a plurality of instructions stored in the main memory 3900, and the at least one of operations of FIG. 13 may be performed by the main processor 3700 executing the plurality of instructions stored in the main memory 3900.

The devices and/or methods of uplink power control according to the inventive concepts may improve detection accuracy of a TPC command through a correlation calculation.

Furthermore, the devices and/or methods of uplink power control according to the inventive concepts may improve detection accuracy of a TPC command by excluding a link with low reliability.

Furthermore, the devices and methods of uplink power control according to the inventive concepts may increase efficiency of a power control technique in a wireless communication system by improving detection accuracy of a TPC command.

While the inventive concepts have been particularly shown and described with reference to some example embodiments thereof, it will be understood that various changes in form and details may be made therein without departing from the spirit and scope of the following claims.

What is claimed is:

1. A method of uplink power control, the method comprising:
   generating a transmission power control (TPC) sequence from TPC commands, the TPC commands received on a series of slots, the series of slots forming one radio frame;
   calculating a plurality of correlation results by executing correlation calculations between the TPC sequence and a plurality of command sequences, each of the plurality of command sequences including predefined values; and
   deciding an overall TPC command based on the plurality of correlation results.

2. The method of claim 1, wherein
   each of the plurality of command sequences corresponds to one of uplink power-up, uplink power-down, or uplink power-hold, and
   the deciding an overall TPC command includes deciding the overall TPC command as one of the uplink power-up, uplink power-down, or uplink power-hold based on a maximum correlation result from among the plurality of correlation results.

3. The method of claim 1, wherein
   the TPC sequence comprises five elements, the five elements corresponding to five slots, respectively,
   the plurality of command sequences comprise a first sequence [s, s, s, s, s], a second sequence [−s, −s, −s, −s, −s], a third sequence [−s, s, −s, s, −s], and a fourth sequence [s, −s, s, −s, s] (where s is a positive real number), and
   the calculating a plurality of correlation results includes calculating first to fourth correlation results by executing a correlation calculation between each of the first to fourth sequences and the TPC sequence.

4. The method of claim 3, wherein the deciding an overall TPC command comprises:
   extracting a maximum correlation result from among the first to fourth correlation results; and
   determining the overall TPC command as uplink power-up when the maximum correlation result is the first correlation result, deciding the overall TPC command as uplink power-down when the maximum correlation result is the second correlation result, and deciding the overall TPC command as uplink power-hold when the maximum correlation result is the third or fourth correlation result.

5. The method of claim 1, further comprising:
   providing the TPC commands by combining TPC symbols received through radio links (RLs) of an identical radio link set (RLS); and
   wherein the calculating a plurality of correlation results includes executing a correlation calculation between each of a plurality of TPC sequences and the plurality of command sequences, the plurality of TPC sequences corresponding to a plurality of RLSs, respectively.

6. The method of claim 5, wherein the deciding an overall TPC command comprises:
   estimating reliability of each of the plurality of RLSs; and
   determining the overall TPC command based on some correlation results from among the plurality of correlation results, the some correlation results associated with RLSs with reliability of a threshold value or higher from among the plurality of RLSs.

7. The method of claim 6, wherein
   the estimating reliability of each of the plurality of RLSs includes estimating the reliability based on signal-to-interference-plus-noise-ratios (SINRs) of the plurality of RLSs.

8. The method of claim 6, wherein
   the estimating reliability of each of the plurality of RLSs includes estimating the reliability based on a maximum correlation result of each of the plurality of RLSs.

9. The method of claim 1, further comprising:
   generating the TPC commands using an uplink power control algorithm 2 of a frequency division duplex (FFD) universal mobile telecommunications system (UMTS).

10. A device for uplink power control, the device comprising:
    a sequence generator configured to generate a transmission power control (TPC) sequence from TPC commands, the TPC commands received on a series of slots, the series of slots forming one radio frame;
    a correlation calculator configured to calculate a plurality of correlation results by executing correlation calculations between the TPC sequence and a plurality of command sequences, each of the plurality of command sequences including predefined values; and
    a TPC command determiner configured to decide an overall TPC command based on the plurality of correlation results.

11. The device of claim 10, wherein
    each of the plurality of command sequences corresponds to one of uplink power-up, uplink power-down, or uplink power-hold, and
    the TPC command determiner is configured to decide the overall TPC command as one of the uplink power-up, uplink power-down, or uplink power-hold based on a maximum correlation result from among the plurality of correlation results.

12. The device of claim 10, wherein
    the sequence generator is further configured to generate the TPC sequence comprising five elements, the five elements corresponding to five slots, respectively,
    the plurality of command sequences comprise a first sequence [s, s, s, s, s], a second sequence [−s, −s, −s, −s, −s], a third sequence [−s, s, −s, s, −s], and a fourth sequence [s, −s, s, −s, s] (where s is a positive real number), and
    the correlation calculator is further configured to calculate first to fourth correlation results by executing a correlation calculation between each of the first to fourth sequences and the TPC sequence.

13. The device of claim 12, wherein the TPC command determiner comprises:
    a correlation result comparator configured to extract a maximum correlation result from among the first to fourth correlation results; and
    an overall TPC command generator configured to generate the overall TPC command indicating uplink power-up when the maximum correlation result is the first correlation result, generate the overall TPC command indicating uplink power-down when the maximum correlation result is the second correlation result, and generate the overall TPC command indicating uplink power-hold when the maximum correlation result is the third or fourth correlation result.

14. The device of claim 10, further comprising:
a transceiver configured to provide the TPC commands by combining TPC symbols received through radio links (RLs) of an identical radio link set (RLS), and
the correlation calculator configured to execute a correlation calculation between each of a plurality of TPC sequences and the plurality of command sequences, the plurality of TPC sequences corresponding to a plurality of RLSs, respectively.

15. The device of claim 14, wherein the TPC command determiner comprises:
a reliability estimator configured to estimate reliability of each of the plurality of RLSs; and
a TPC command generator configured to generate the overall TPC command based on select correlation results from among the plurality of correlation results, the select correlation results corresponding to select RLSs with reliability of a threshold value or higher from among the plurality of RLSs.

16. A method of uplink power control, the method comprising:
receiving a plurality of transmission power control (TPC) commands on a series of slots, the series of slots forming one radio frame;
generating a TPC sequence from the plurality of TPC commands, the TPC sequence including N elements, by buffering the plurality of TPC commands on N slots (where N is a natural number);
calculating a plurality of correlation results between the TPC sequence and a plurality of command sequences, the plurality of command sequences being command sequences stored in a memory, each of the plurality of command sequences including predefined values and corresponding to one of uplink power-up, uplink power-down, or uplink power-hold; and
determining an overall TPC command based on the plurality of correlation results.

17. The method of claim 16, wherein the determining an overall TPC command includes deciding the overall TPC command based on a correlation result having a maximum value from among the plurality of correlation results.

18. The method of claim 16, wherein
the receiving a plurality of TPC commands includes,
combining TPC symbols in a plurality of radio links (RLs) included in an identical radio link sets (RLS) from among a plurality of radio link sets (RLSs), and
generating the plurality of TPC commands corresponding to the plurality of RLSs, respectively, and
the calculating a plurality of correlation results calculates the plurality of correlation results between each of a plurality of TPC sequences and the plurality of command sequences, the plurality of TPC sequences corresponding to the plurality of RLSs, respectively.

19. The method of claim 18, wherein the determining an overall TPC command includes,
estimating a reliability index of the plurality of RLSs based on the plurality of correlation results, and
generating the overall TPC command based on the reliability index and at least some correlation results from among the plurality of correlation results, the at least some correlation results corresponding to at least some RLS from among the plurality of RLSs, the at least some RLSs having a value of the reliability index equal to or higher than a threshold value.

20. The method of claim 18, wherein the determining an overall TPC command includes,
estimating a reliability index of the plurality of RLSs based on signal-to-interference-plus-noise-ratios (SINR) of the plurality of RLSs,
generating one or more temporary TPC commands from the plurality of correlation results based on a maximum correlation result from among the plurality of correlation results corresponding to an RLS from among the plurality of RLSs, and
generating the overall TPC command based on the reliability index and at least some correlation results from among the plurality of correlation results, and at least some of the one or more temporary TPC commands.

* * * * *